US010955348B2

United States Patent
Hell et al.

(10) Patent No.: US 10,955,348 B2
(45) Date of Patent: *Mar. 23, 2021

(54) METHOD OF LOCALLY IMAGING A STRUCTURE IN A SAMPLE AT HIGH SPATIAL RESOLUTION IN ORDER TO DETECT REACTIONS OF AN OBJECT OF INTEREST TO ALTERED ENVIRONMENTAL CONDITIONS

(71) Applicant: Max-Planck-Gesellschaft zur Foerderung der Wissenschaften e.V., Munich (DE)

(72) Inventors: Stefan W. Hell, Goettingen (DE); Fabian Goettfert, Goettingen (DE); Volker Westphal, Hannover (DE)

(73) Assignee: MAX-PLANCK-GESELLSCHAFT ZUR FOERDERUNG DER WISSENSCHAFTEN E.V., Munich (DE)

( * ) Notice: Subject to any disclaimer, the term of this patent is extended or adjusted under 35 U.S.C. 154(b) by 205 days.

This patent is subject to a terminal disclaimer.

(21) Appl. No.: 16/123,280

(22) Filed: Sep. 6, 2018

(65) Prior Publication Data

US 2019/0011367 A1 Jan. 10, 2019

Related U.S. Application Data

(63) Continuation of application No. PCT/EP2017/055360, filed on Mar. 7, 2017.

(30) Foreign Application Priority Data

Mar. 7, 2016 (DE) ...................... 10 2016 104 100.9

(51) Int. Cl.
*G01N 21/64* (2006.01)
*G02B 21/00* (2006.01)
(Continued)

(52) U.S. Cl.
CPC ..... *G01N 21/6458* (2013.01); *G01N 21/6428* (2013.01); *G01N 21/75* (2013.01);
(Continued)

(58) Field of Classification Search
None
See application file for complete search history.

(56) References Cited

U.S. PATENT DOCUMENTS

| 7,646,481 B2 | 1/2010 | Dyba et al. |
| 7,679,741 B2 | 3/2010 | Dyba et al. |

(Continued)

FOREIGN PATENT DOCUMENTS

| CN | 104152341 A | 11/2014 |
| DE | 10 2005 027 896 A1 | 12/2006 |

(Continued)

OTHER PUBLICATIONS

PCT International Preliminary Report on Patentability in copending, related PCT Application No. PCT/EP2017/055360; dated Sep. 11, 2018.

(Continued)

*Primary Examiner* — David P Porta
*Assistant Examiner* — Mamadou Faye
(74) *Attorney, Agent, or Firm* — Thomas | Horstemeyer, LLP

(57) ABSTRACT

For high spatial resolution imaging a structure marked with luminescence markers, light that has an effect on the emission of luminescence light by the luminescence markers is directed onto a sample with an intensity distribution having a central zero point. Scan areas of the sample are scanned with the zero point. Luminescence light emitted out of a local area including the zero point is registered and assigned to the respective location of the zero point in the sample. Several copies of an object of interest are arranged in the (Continued)

scan areas and subjected to varying surrounding conditions. The individual scan areas are scanned with the respective zero point at least two times at two different stages of reactions to the varying surrounding conditions. Dimensions of the scan areas are limited such that they are not larger than 75% of a distance of intensity maxima delimiting the zero point.

25 Claims, 11 Drawing Sheets

(51) Int. Cl.
    *G02B 27/58* (2006.01)
    *G01N 21/75* (2006.01)
(52) U.S. Cl.
    CPC ....... *G02B 21/008* (2013.01); *G02B 21/0036* (2013.01); *G02B 21/0072* (2013.01); *G02B 21/0076* (2013.01); *G02B 27/58* (2013.01); *G01N 2021/6439* (2013.01)

(56) References Cited

U.S. PATENT DOCUMENTS

| | | | |
|---|---|---|---|
| 7,719,679 | B2 | 5/2010 | Hell et al. |
| 7,903,247 | B2 | 3/2011 | Dyba et al. |
| 8,520,280 | B2 | 8/2013 | Engelhardt |
| 8,586,945 | B2 | 11/2013 | Reuss et al. |
| 8,704,196 | B2 | 4/2014 | Wolleschensky et al. |
| 8,705,172 | B2 | 4/2014 | Kleppe et al. |
| 9,024,279 | B2 | 5/2015 | Hell |
| 9,188,784 | B2 | 11/2015 | Baer |
| 9,267,888 | B2 | 2/2016 | Hell |
| 9,291,562 | B2 | 3/2016 | Hell |
| 9,377,406 | B2 | 6/2016 | Hell |
| 9,632,297 | B1* | 4/2017 | Reuss ............... G02B 21/0032 |
| 9,719,928 | B2 | 8/2017 | Hell |
| 9,891,417 | B2* | 2/2018 | Hell ............... G02B 21/0036 |
| 2012/0021410 | A1* | 1/2012 | Yin ............... C07K 1/13 435/6.1 |
| 2012/0104279 | A1 | 5/2012 | Reuss et al. |
| 2013/0201558 | A1 | 8/2013 | Baer |
| 2014/0097358 | A1 | 4/2014 | Hell et al. |
| 2014/0340482 | A1 | 11/2014 | Kanarowski |
| 2016/0024042 | A1 | 1/2016 | Silverman |
| 2017/0123197 | A1* | 5/2017 | Reuss ............... G02B 21/0028 |
| 2018/0024063 | A1 | 1/2018 | Egner et al. |

FOREIGN PATENT DOCUMENTS

| | | |
|---|---|---|
| DE | 10 2006 009 833 B4 | 1/2009 |
| DE | 10 2008 054 317 A1 | 5/2010 |
| DE | 10 2011 051 086 A1 | 12/2012 |
| DE | 10 2011 055 367 A1 | 5/2013 |
| DE | 102013100174 A1 | 7/2014 |
| DE | 10 2013 017 468 A1 | 3/2015 |
| DE | 10 2013 114 860 B3 | 5/2015 |
| DE | 10 2015 105 018 A1 | 10/2016 |
| EP | 2 317 362 A1 | 10/2010 |
| JP | 2015 200693 A | 11/2015 |
| WO | 2010/069987 A1 | 6/2010 |
| WO | 2011/131591 A1 | 10/2011 |
| WO | 2014/108455 A1 | 7/2014 |

OTHER PUBLICATIONS

Li D et al.: Extended-resolution structured illumination imaging of endocytic and cytoskeletal dynamics, Science Aug. 28, 2015; 349(6251).
R A Hoebe et al.: Controlled light-exposure microscopy reduces photobleaching and phototoxicity in fluorescence live-cell imaging, Nature Biotechnology, vol. 25, No. 2, Feb. 2007, pp. 249 to 253.
T. Staudt et al.: Far-field optical nanoscopy with reduced number of state transition cycles, Optics Express vol. 19, No. 6, Mar. 14, 2011, pp. 5644 to 5657.
Göttfert et al. "Strong signal increase in STED fluorescence microscopy by imaging regions of subdiffraction extent", PNAS, vol. 114, No. 9, Seiten 2125-2130, with "Supporting Information", published Feb. 28, 2017.
Göttfert "STED microscopy with scanning fields below the diffraction limit", dissertation, Georg-August University School of Science (GAUSS), published Nov. 17, 2016.
Balzarotti et al. "Nanometer resolution imaging and tracking of fluorescent molecules with minimal photon fluxes", Science 355, pp. 606-612, published Feb. 10, 2017.
Danzl et al. "Coordinate-targeted fluorescence nanoscopy with multiple off states", Nature Photonics, vol. 10, pp. 122-129, published Jan. 18, 2016.
Bingen et al. "Parallelized STED fluorescence nanoscopy", Optics Express, vol. 24, No. 24, pp. 23716-23726, published Nov. 7, 2011.

\* cited by examiner

METHOD OF LOCALLY IMAGING A STRUCTURE IN A SAMPLE AT HIGH SPATIAL RESOLUTION IN ORDER TO DETECT REACTIONS OF AN OBJECT OF INTEREST TO ALTERED ENVIRONMENTAL CONDITIONS

CROSS REFERENCE TO RELATED APPLICATIONS

This application is a continuation to International Patent Application No. PCT/EP2017/055360 filed on Mar. 7, 2017, entitled "Verfahren zum hochaufgelösten lokalen Abbilden einer Struktur in einer Probe, um Reaktionen eines interessierenden Objekts auf veränderte Umgebungsbedingungen zu erfassen", and claiming priority to German Patent Application No. DE 10 2016 104 100.9 filed on Mar. 7, 2016, and entitled "Verfahren zum hochaufgelösten lokalen Abbilden einer Struktur in einer Probe".

FIELD

The present invention relates to a method of spatial high resolution imaging a structure in a sample, the structure being marked with luminescence markers.

The invention belongs to the field of high resolution scanning luminescence light microscopy in which measures are taken which allow for assigning luminescence light emitted out of the respective sample to a location in the sample at a higher spatial resolution than the diffraction barrier at the wavelength of the luminescence light and at the wavelength of any excitation light by which the luminescence markers are excited for the emission of luminescence light in a spatially limited area. Often, the luminescence markers are fluorescence markers that emit fluorescence light as luminescence light after excitation by excitation light. Then, one refers to fluorescence microscopy.

BACKGROUND

In known methods of and in scanning luminescence light microscopes for spatial high resolution imaging a structure in a sample, the structure being marked with luminescence markers, light that has an effect on the emission of luminescence light by the luminescence markers is directed onto the sample with an intensity distribution that has a zero point and intensity maxima neighboring the zero point for increasing the spatial resolution. Often, this light is luminescence inhibiting light inhibiting the emission of luminescence light by all those luminescence markers which are outside the zero point. The luminescence light emitted out of the sample may thus be assigned to the location of the zero point in the sample, as only luminescence markers located there are able to emit luminescence light.

For instance, in STED fluorescence microscopy, fluorescence markers previously excited by means of excitation light are de-excited again by means of stimulation light as fluorescence inhibiting light, except of those fluorescence markers in the area of the zero point, so that only the fluorescence markers located in the area of the zero point may have emitted fluorescence light measured afterwards. This fluorescence light may thus be assigned to the location of the zero point in the sample. The spatial distribution of the fluorescence marker within the sample is determined by scanning the sample with the zero point. In this way, the shape and the spatial distribution of a structure in the sample, which is marked with the fluorescence markers, may be imaged.

In GSD fluorescence microscopy, the fluorescence inhibiting light transfers those fluorescence markers outside the area of the zero point into an electronic dark state so that they are no longer excitable for emission of fluorescence light by means of excitation light.

In RESOLFT fluorescence microscopy, fluorescence inhibiting light is used which transfers photochromic fluorescence markers out of a fluorescent state into a non-fluorescent state, except of those fluorescence markers in the area of the zero point. When the fluorescence markers are afterwards subjected to excitation light, only those fluorescence markers in the area of the zero point of the intensity distribution of the fluorescence inhibiting light are excited for the emission of fluorescence light by the excitation light. Thus, the fluorescence light emitted by the fluorescence markers in the sample may also be assigned to the location of the zero point of the intensity distribution of the fluorescence inhibiting light in the sample, here.

In all methods of high spatial resolution scanning luminescence light microscopy described up to here, there is an essential danger of temporarily or even permanently bleaching the luminescence markers in the respective sample, i.e. of deactivating them so that they can no longer emit luminescence light. This danger is due to the fact that the intensity of the luminescence inhibiting light has to be very high in order to stop essentially all luminescence markers outside the area of the zero point from the emission of luminescence light and to also strongly spatially delimit the dimensions of the area of the zero point out of which the luminescence markers may still emit luminescence light. With this high intensity, the luminescence inhibiting light already stresses the luminescence markers in the sample when the area of the zero point of the luminescence inhibiting light gets closer to the luminescence markers, i.e. already before they get into the area of the zero point for a first time and thus prior to luminescence light emitted by them being registered for the first time. This may have the consequence that luminescence markers having a tendency to bleach may not be used in the described methods at all or may at least not be used with high intensities of the luminescence inhibiting light as they are desirable for maximizing the spatial resolution.

Several approaches were pursued to avoid the described problems of a temporal and particularly of a permanent bleaching in high resolution scanning luminescence light microscopy. German patent application publication DE 10 2005 027 896 A1 and U.S. Pat. No. 7,719,679 B2 belonging to the same patent family teach to apply stimulation light to a sample in STED fluorescence microscopy in pulses at comparatively long temporal intervals or while very quickly scanning the respective sample with a zero point of an intensity distribution of the stimulation light so that same areas of the sample are subjected to the high intensity of the fluorescence inhibiting light in maxima neighboring the zero point at an optimized temporal repetition interval, only. In this way, the intensity of fluorescence light obtainable from the sample is increased, as the rate at which the fluorescence markers get into a permanent or only slowly decaying dark state out of an excited intermediate state due to further excitation by the stimulation light is reduced considerably. In other words, the overall amount of fluorescence light obtainable from the entire sample within a certain period of time is maximized by means of the comparatively long repetition interval at which each individual area of the sample is subjected to the intensity distribution of the fluorescence inhibiting light. This procedure also reduces the tendency of the fluorescence markers to bleach as a higher population of excited states out of which a photochemical destruction of the fluorescence markers may occur is avoided.

For carrying out high spatial resolution fluorescence microscopy even with fluorescence markers tending to bleach, German patent application publication DE 10 2011 051 086 A1 and US patent application publication US 2014/0097358 A1 belonging to the same patent family teach to adjust scanning conditions with regard to each other, which—besides a scanning speed at which the sample is scanned and a light intensity of an intensity distribution of fluorescence inhibiting light—include properties and a concentration of the fluorescence markers within the sample, in such a way that the fluorescence light is emitted out of the area of a zero point of the intensity distribution of the fluorescence inhibiting light as individually detectable photons. An image of a structure in the sample, which is marked with the fluorescence markers, is then composed of the locations of the zero point, to which the detected photons are assigned during several repetitions of scanning the sample with the zero point. In this way, the probability of bleaching the fluorescence markers, before they are reached with the zero point and thus measured for the first time, is reduced. This is due to the fact that the probability of bleaching is correlated with the intensity of the fluorescence light obtained from the individual fluorescence markers. As the fluorescence light is minimized to individual photons, the danger of bleaching is also minimized. Generally, however, in the method known from DE 10 2011 051 086 A1 and US 2014/0097358 A1, the zero point of the fluorescence inhibiting light still only reaches the individual fluorescence markers after they have previously been subjected to the high intensities in the area of the intensity maxima of the fluorescence inhibiting light neighboring the zero point.

For being able to also use bleaching-prone substances in high spatial resolution scanning luminescence light microscopy, it is known from International patent application publication WO 2011/131591 A1 and U.S. Pat. No. 9,024,279 B2 belonging to the same patent family to move a measurement front across the sample in which a structure of interest is marked with luminescence markers. In the measurement front, the intensities of optical signals increase over a depth of the measurement front which is smaller than the diffraction barrier at the wavelength of the optical signals in such a way that a portion of the luminescence markers which emit luminescence light is increased starting from non-existing and then reduced back to non-existing again by first transferring the luminescence markers into a luminescent state and by then transferring the luminescence markers into a non-luminescent state. The luminescence light out of the area of the measurement front is registered and assigned to the respective position of the measurement front in the sample. The assignment of the luminescence light to a certain location along the measurement front may also take place at a spatial resolution beyond the diffraction barrier by, for example, assigning the registered photons to a single luminescence marker in a same way as in a light microscopic method known as GSDIM.

An option of increasing the speed of imaging a structure of interest of a sample in scanning luminescence light microscopy is to scan the sample with a plurality of zero points of luminescence inhibiting light in parallel. Here, the luminescence light emitted out of the sample is separately assigned to the individual zero points of the luminescence inhibiting light. From German patent DE 10 2006 009 833 B4 and U.S. Pat. No. 7,903,247 B2 and U.S. Pat. No. 7,646,481 B2 belonging to the same patent family it is known to form an intensity distribution of luminescence inhibiting light with a grid of zero points in that two orthogonal line patterns of luminescence inhibiting light are superimposed within the sample. An interference between the light of the two line patterns is avoided so that their intensity distributions simply add up. The desired zero points of the intensity distribution of the luminescence inhibiting light remain at the crossing points of the line-shaped zero points of both line gratings, and they are delimited by neighboring intensity maxima of the luminescence inhibiting light. To completely scan the sample in the area of the grid-shaped arrangement of the zero points, it is sufficient to shift each zero point over the distances to its nearest neighbors in the two directions of the two line patterns. Again, most of the luminescence markers in the sample are subjected to high light intensities of the luminescence inhibiting light before one of the zero points reaches them so that they are registered for the first time. Thus, the luminescence markers have to be selected such that they withstand these high light intensities without bleaching.

Li D et al.: Extended-resolution structured illumination imaging of endocytic and cytoskeletal dynamics, Science 2015 Aug. 28; 349(6251) disclose a method of spatial high resolution imaging a structure in a sample, the structure being marked with activatable fluorescence markers, wherein the sample is successively scanned with coinciding line- or plane-shaped zero points of light intensity distributions of fluorescence activation light and fluorescence inhibiting light in different directions, and wherein the fluorescence light emitted by the sample is registered with a camera. By means of evaluating the registered light intensities, an image of the structure of interest in the sample may be reconstructed whose spatial resolution is increased due to narrowing down the coinciding zero points of the fluorescence activation light and the fluorescence excitation light out of which no fluorescence light is emitted from the sample. Further, in this known method, the zero points of the fluorescence activation light and of the fluorescence excitation light which simultaneously acts as fluorescence deactivation light are delimited by intensity maxima of the fluorescence activation light and the fluorescence excitation light. All luminescence markers in the sample are subjected to the high intensities of the fluorescence activation light and the fluorescence excitation light in the area of these intensity maxima, before they get into the area of the coinciding zero points of the fluorescence activation light and the fluorescence excitation light. Thus, the risk of bleaching the fluorescence markers, before they contribute to the relevant measurement signal, is very high in this known method as well.

International patent application publication WO 2014/108455 A1 and U.S. Pat. No. 9,267,888 B2 belonging to the same patent family disclose a method of high spatial resolution imaging a structure in a sample, the structure being marked with luminescence markers, in which the sample, like in STED fluorescence microscopy, is subjected to excitation light and to stimulation light as luminescence inhibiting light to reduce the area of the sample to which fluorescence light emitted out of the sample and detected may be assigned to the area of a zero point of the stimulation light. For protecting the luminescence markers against high intensities of the stimulation light in the area of its maxima neighboring the zero point, the sample is additionally subjected to excitation inhibiting light whose intensity distribution has a local minimum which coincides with the zero point of the stimulation light. This excitation inhibiting light may particularly be switch off light which switches switchable luminescence markers located outside the minimum of the excitation inhibiting light into an inactive state in which they are not excitable for emission of fluorescence light by means of the excitation light. Particularly, the luminescence markers may be switchable fluorescence dyes as they are used in high spatial resolution RESOLFT fluorescence microscopy. In the method known from WO 2014/108455 A1 and U.S. Pat. No. 9,267,888 B2, however, the switchability of the luminescence markers is, primarily, not used for increasing the spatial resolution but for protecting the luminescence markers against bleaching due to the high intensities of the stimulation light.

R A Hoebe et al.: Controlled light-exposure microscopy reduces photobleaching and phototoxicity in fluorescence live-cell imaging, Nature Biotechnology, Volume 25, No. 2, February 2007, pages 249 to 253 disclose a method of confocal fluorescence microscopy in which a sample is scanned with focused excitation light to image a structure in the sample, the structure being marked with luminescence markers. Here, the excitation light is switched off in each position of the focused excitation light within the sample as soon as a number of photons which are emitted by the excited luminescence markers in the sample and registered by a detector reach an upper threshold corresponding to a desired signal-to-noise ratio. The excitation light is also switched off if the number of the emitted and registered photons does not reach a lower threshold within a predetermined part of the maximum pixel dwell time, because this indicates that no relevant concentration of luminescence markers is found in the sample at the respective position of the focused excitation light. In this way, the load of the sample by excitation light is considerably reduced as compared to subjecting the sample to the same amount of light at each position.

T. Staudt et al.: Far-field optical nanoscopy with reduced number of state transition cycles, Optics Express Vol. 19, No. 6, 14 Mar. 2011, pages 5644 to 5657 disclose a method called RESCue-STED which transfers the method described by R A Hoebe et al. for confocal fluorescence microscopy to STED fluorescence microscopy. Here, the sample is only subjected to the high intensities of the stimulation light as long as necessary or suitable.

German patent application publication DE 10 2013 100 174 A1 and U.S. Pat. No. 9,377,406 B2 belonging to the same patent family disclose a method of spatial high resolution imaging of a structure of a sample, the structure comprising a luminophore. The sample, in a measurement area, is subjected to an intensity distribution of luminescence inhibiting light comprising a local minimum. Then, the sample, in the measurement area, is subjected to luminescence excitation light which excites the luminophore out of an electronic ground state into a luminescence state, and luminescence light emitted out of the measurement area is registered. The registered luminescence light is assigned to the position of the local minimum within the sample. The luminescence inhibiting light disturbs the electronic ground state of the luminophore such that the luminophore, in the disturbed electronic ground state, has a reduced absorption cross-section for the luminescence excitation light in the disturbed electronic ground state. Prior to registering the luminescence light, the sample may be subjected to STED light in the measurement area which also has a local minimum in the center of the measurement area. If this local minimum is even smaller than the local minimum of the intensity distribution of the luminescence inhibiting light, the spatial assignment of the luminescence light may be delimited even stronger, such that that the spatial resolution in imaging the sample is increased even further. The local minima of the STED light and the fluorescence inhibiting light are concentrically arranged with regard to each other in all positions of the local minimum of the intensity distribution of the fluorescence inhibiting light within the sample.

German patent DE 10 2013 114 860 B3 and U.S. Pat. No. 9,719,928 B2 belonging to the same patent family disclose a method of determining the locations of individual molecules of a substance in a sample. In this method, the individual molecules of the substance are in a fluorescent state in which they are excitable by excitation light for emission of fluorescence light, and distances between the individual molecules of the substance keep a minimum value. The individual molecules of the substance are excited by excitation light for emission of fluorescence light, an intensity distribution of the excitation light comprising at least one zero point. The fluorescence light from the excited individual molecules of the substance is registered for different positions of the at least one zero point of the intensity distribution of the excitation light. Here, a distance between nearest neighboring positions of the at least one zero point, in which the fluorescence light from the excited individual molecules of the substance is registered, is not higher than half the minimum value. The locations of the individual molecules of the substance are derived from the course of the intensity of the fluorescence light from the respective molecule over the positions of the at least one zero point of the intensity distribution of the excitation light in the area of interest of the sample.

International patent application publication WO 2010/069987 A1 and US patent U.S. Pat. No. 8,520,280 B2 belonging to the same patent family disclose a method of dynamically shifting a light beam with regard to an optic focusing the light beam. This method may be used in STED microscopy. In scanning the sample, quick adaptive scanning patterns may be realized which avoid dark background areas or object areas which are of no interest for other reasons to achieve an increased picture repetition rate due to a reduced number of picture points.

US patent application publication US 2012/0104279 A1 and U.S. Pat. No. 8,586,945 B2 belonging to the same patent family disclose a fluorescence light scanning microscope comprising a birefringent chromatic beam forming device. Particularly, the scanning microscope is an STED microscope. Both excitation light and STED light pass through the birefringent chromatic beam forming device, the beam forming device not affecting the formation of an intensity maximum of the excitation light in the focus of an objective lens but having the effect that the STED light forms an intensity distribution comprising an intensity minimum at the location of the intensity maximum of the excitation light.

European patent application publication EP 2 317 362 and U.S. Pat. No. 8,705,172 B2 belonging to the same patent family disclose a microscopic method with increased resolution in which a sample is twice scanned with an intensity maximum of excitation light to generate two pictures of the sample. Scanning points which form the basis of both pictures are offset by a step size below the optical resolution limit of the method with regard to each other, and the resulting differences of the pictures are evaluated for obtaining an increased spatial resolution. A similar method is known from German patent application publication DE 10

2013 017 468 A1 and US patent application publication US 2016/024042 A1 belonging to the same patent family.

US patent application publication US 2013/0201558 A1 and U.S. Pat. No. 9,188,784 B2 belonging to the same patent family disclose a beam shaping device for shaping a beam with a central zero point. The beam shaping device may be used in STED microscopy. In this known beam shaping device, a scanning angle which is adjusted in scanning a sample with the beam is limited, because it disturbs the relative phase shifts of the beam which are adjusted by different waveplates for forming the central zero point.

U.S. Pat. No. 7,679,741 B2 discloses a method of high spatial resolution examination of samples which belongs to RESOLFT microscopy using switchable substances. In one embodiment, the known method comprises a formation of a plurality of zero points of fluorescence inhibiting light to examine the sample in a plurality of partial areas at the same time.

There still is a need of a method of high spatial resolution imaging a structure in a sample, the structure being marked with luminescence markers, in which the load to the luminescence markers in the sample by high light intensities is generally reduced so that even luminescence markers which are sensitive to high light intensities may be used, and a structure in the respective sample may be imaged repeatedly to measure reactions of an object of interest to changing surrounding conditions.

SUMMARY OF THE INVENTION

The present invention provides a method of high resolution imaging a structure in a sample, the structure being marked with luminescence markers. The method comprises directing light that has an effect on the emission of luminescence light by the luminescence markers onto the sample with an intensity distribution which has a zero point and intensity maxima neighboring the zero point in at least one direction and having a distance in the at least one direction; scanning scan areas with the zero point, the scan areas being parts of the sample; while scanning the scan areas, registering luminescence light emitted out of a local area including the zero point in the sample; assigning the registered luminescence light to a respective location of the zero point in the sample; and limiting dimensions of the scan areas, in the at least one direction in which the intensity maxima are neighboring the zero point in the sample, to not more than 75% of the distance of the intensity maxima in the at least one direction. Each of a plurality of copies of an object of interest is arranged such that it overlaps with one of the scan areas; and the plurality of copies of the object of interest are subjected to varying surrounding conditions to measure reactions of the object of interest to the varying surrounding conditions, wherein the individual scan areas are scanned with the respective zero point at least two times at two different stages of the reactions to the varying surrounding conditions.

In an embodiment of the method of the present invention, the two times at which the scan areas are scanned with the respective zero point are selected from
 a time prior to varying the surrounding conditions,
 a first time during varying the surrounding conditions,
 a second time during varying the surrounding conditions arranged at an interval of time to the first time, and
 a time after varying the surrounding conditions.

Other features and advantages of the present invention will become apparent to one with skill in the art upon examination of the following drawings and the detailed description. It is intended that all such additional features and advantages be included herein within the scope of the present invention, as defined by the claims.

SHORT DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

FIG. 1 schematically shows intensity distributions of excitation light and fluorescence inhibiting light as an example of light which has an effect on the emission of luminescence light by luminescence markers in the sample, and the resulting effective excitation of fluorescence markers in a sample for emission of fluorescence light.

Figure 5:
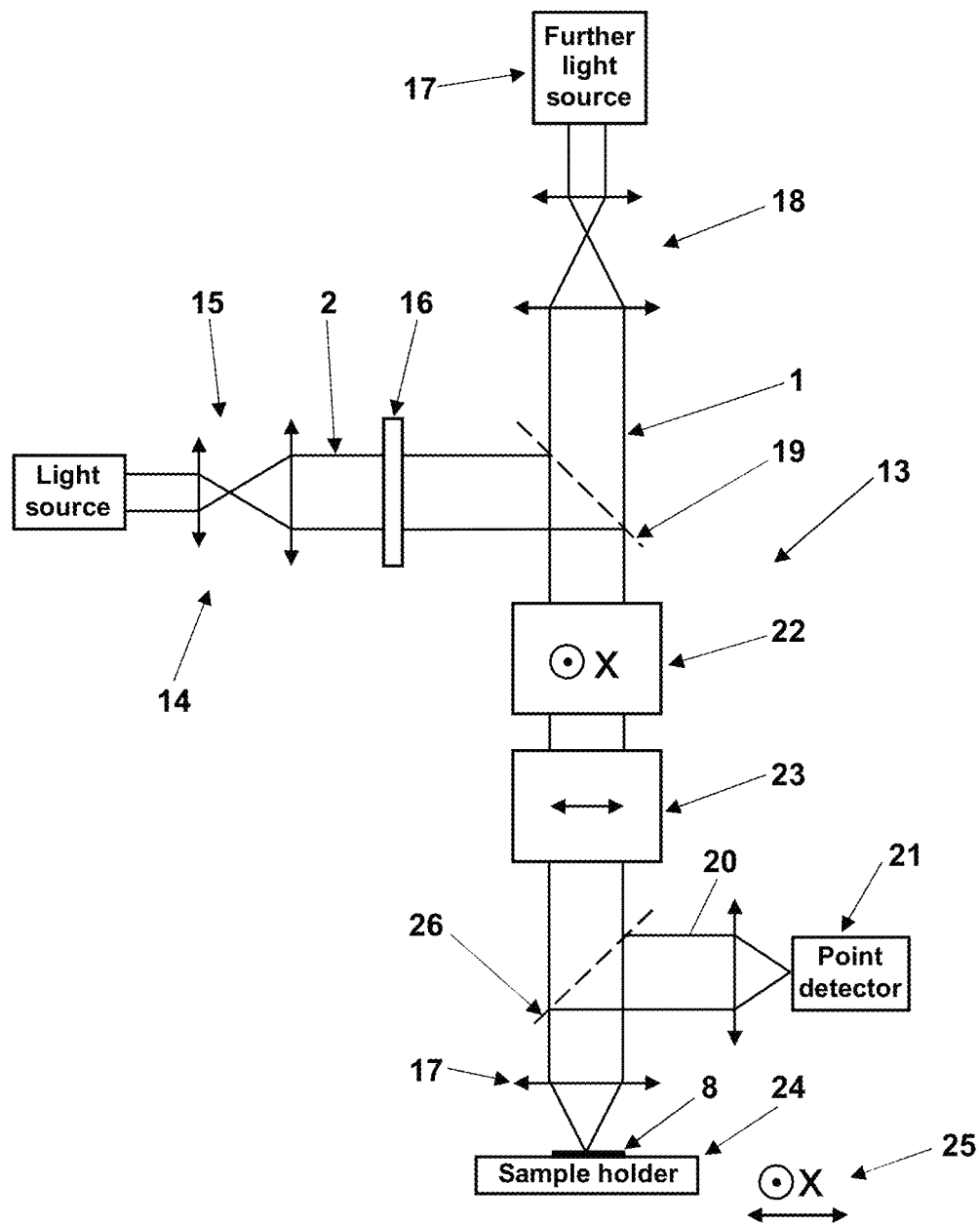

FIG. 5 schematically illustrates a fluorescence microscope as an example of a scanning luminescence light microscope for executing the method according to the invention.

FIG. 6A shows a confocal image of a sample taken upfront, and FIG. 6B shows a partial image of the sample taken according to the present invention, after individual scan areas of the sample have been selected based on the confocal image.

Figure 7:
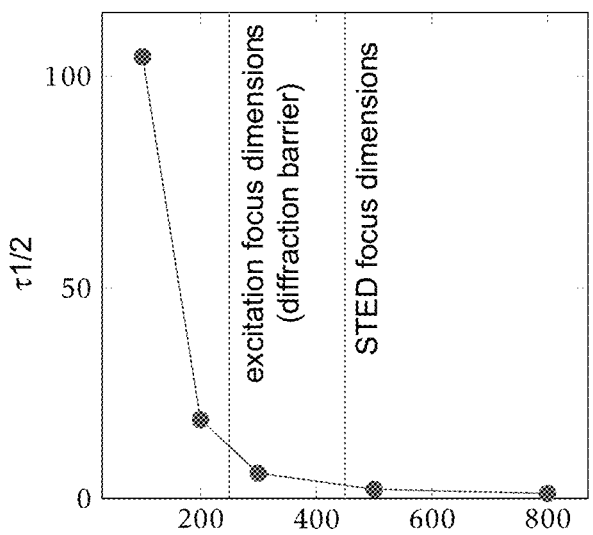

FIG. 7 shows the dependency between the number of the images which may successively be taken of a scan area of the sample and the dimensions of the scan area.

Figure 8:
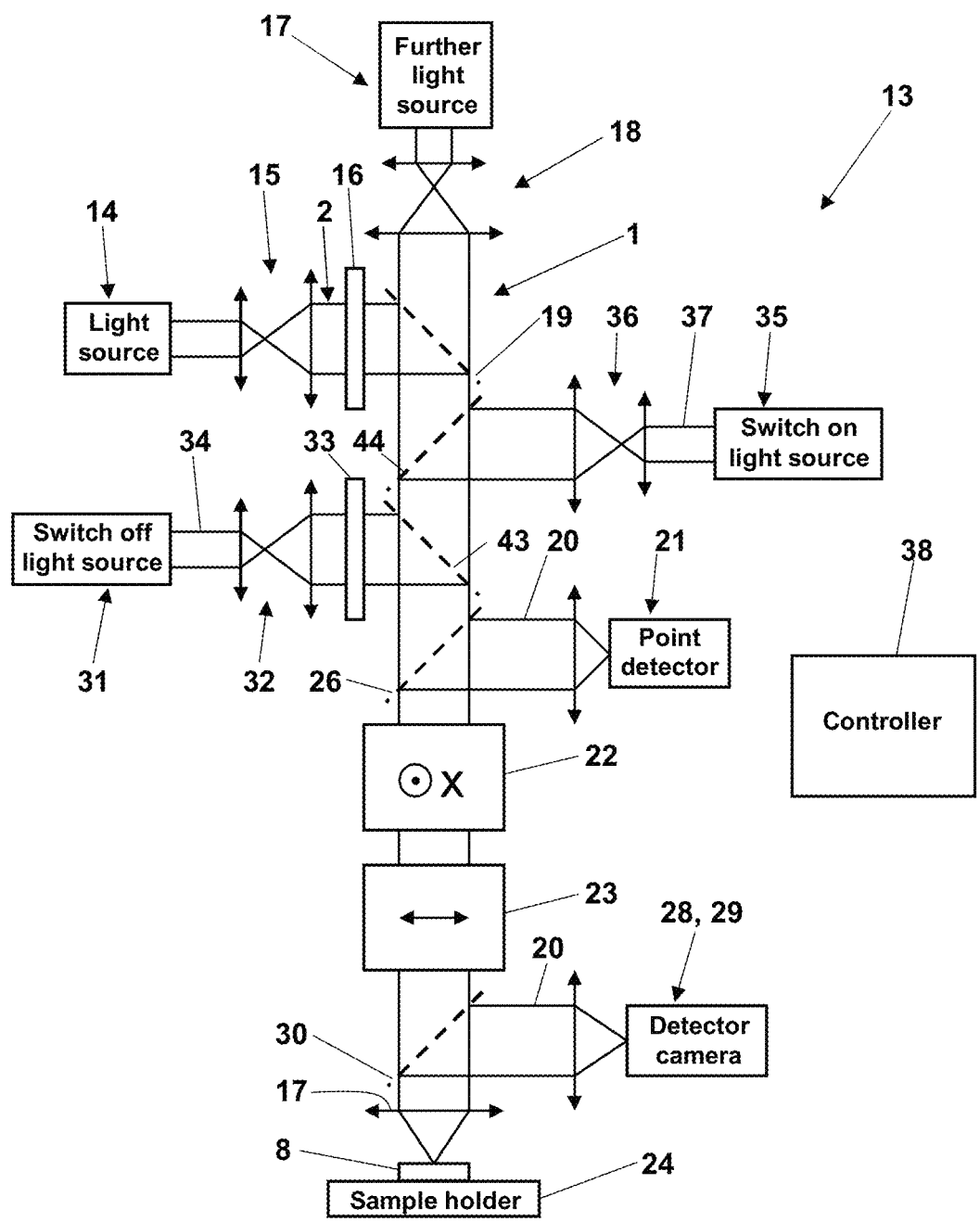

FIG. 8 schematically shows another fluorescence microscope than in FIG. 5 as a further embodiment example of a scanning luminescence microscope for executing the method according to the invention.

Figure 9:
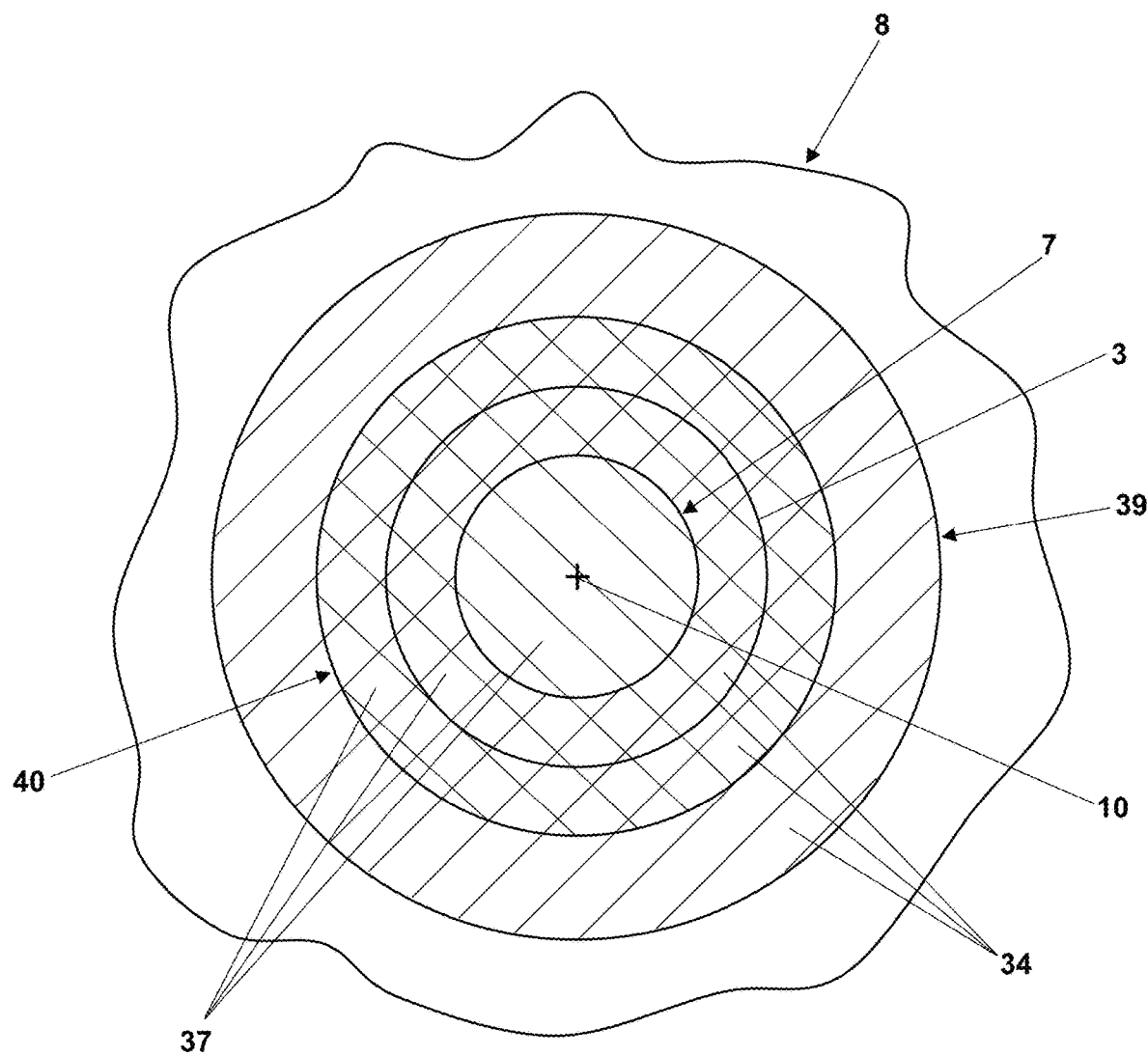

FIG. 9 is a schematic drawing of a scan area of a sample to be scanned with additional depiction of a neighboring area in which switch off light is directed onto the sample by means of the scanning fluorescence microscope of FIG. 8.

Figure 10:
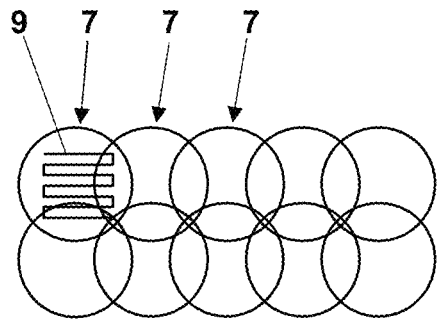
Figure 10:
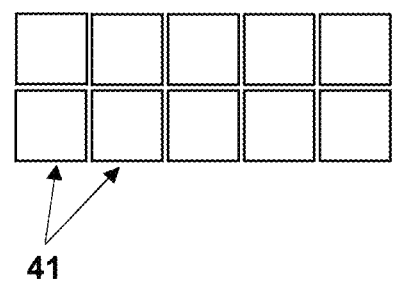

FIG. 10 A and FIG. 10 B illustrates arrangements of several scan areas in the sample, which are to be scanned according to FIG. 9, to scan the sample with the scan areas.

Figure 11:
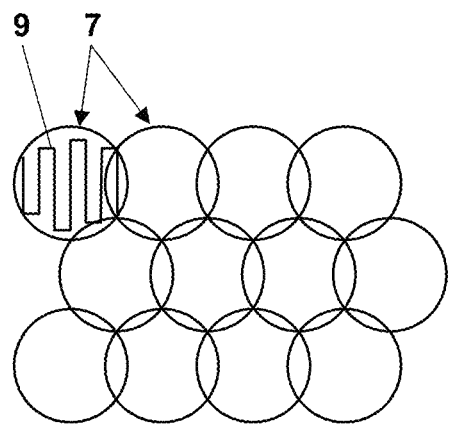
Figure 11:
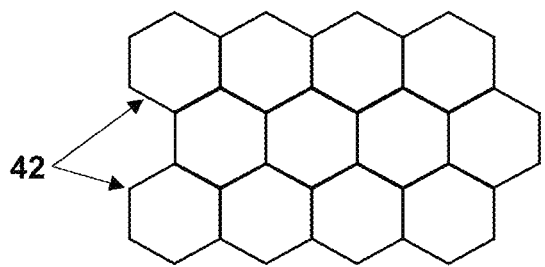

FIG. 11 A and FIG. 11 B illustrate other arrangements of the scan areas in the sample.

Figure 12:
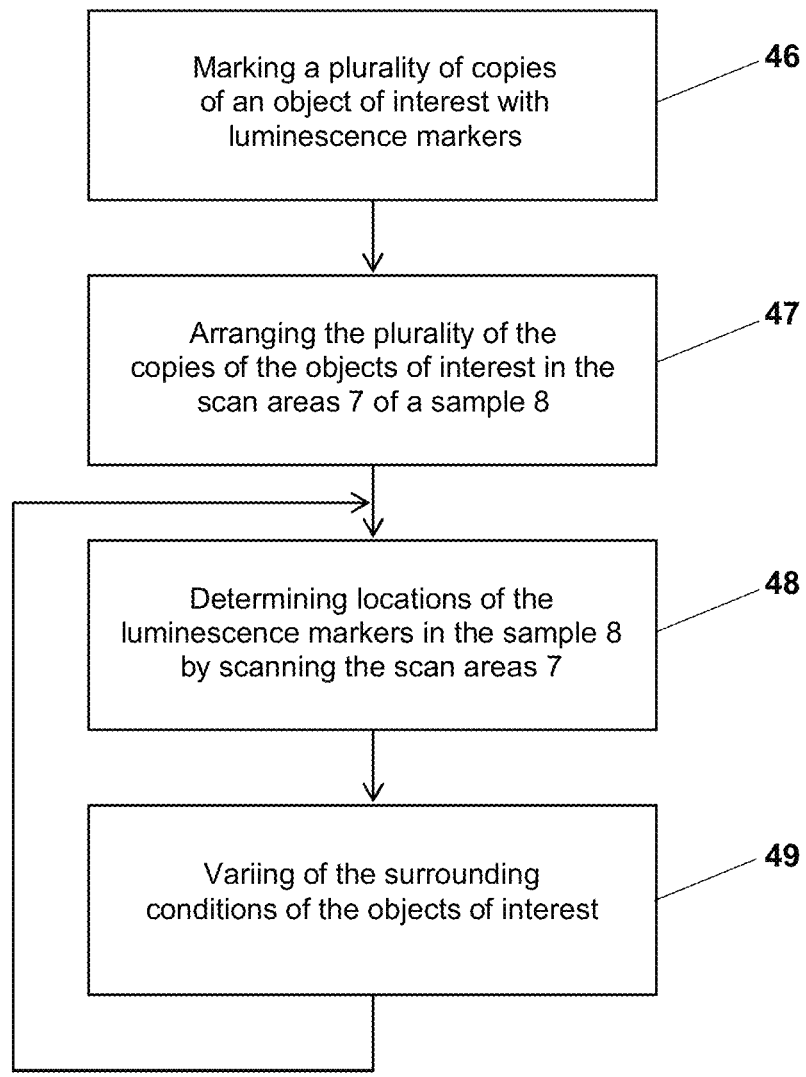
Figure 13:
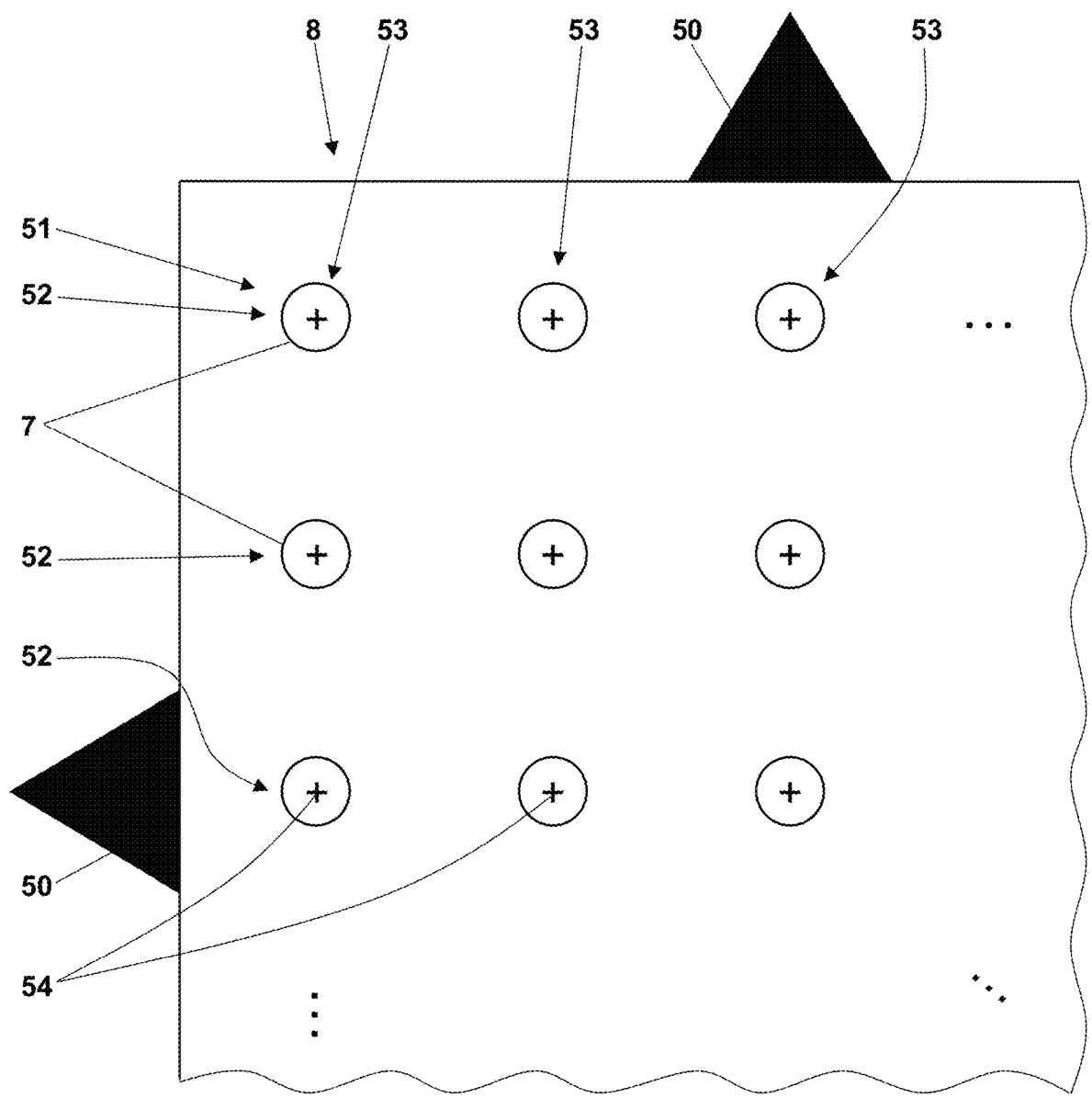

FIG. 12 is a block diagram of one embodiment of the method according to the present invention FIG. 13 illustrates the arrangement of scan areas in a sample in the method according to FIG. 12.

Figure 14:
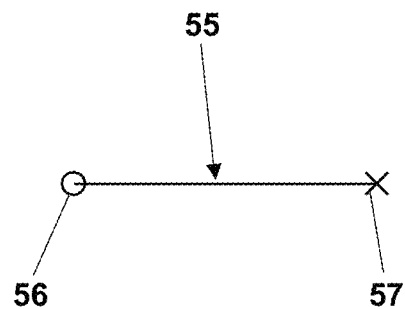
Figure 14:
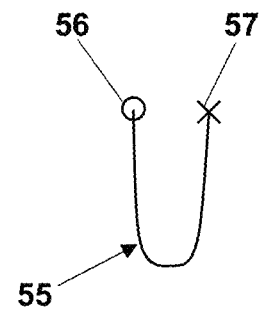
Figure 15:
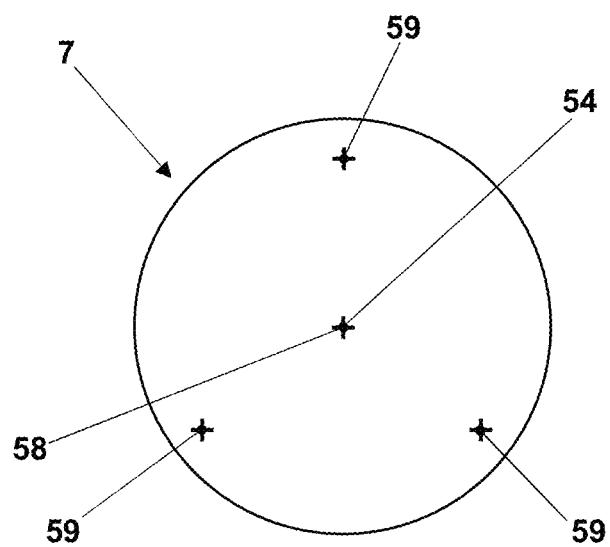

FIG. 14A and FIG. 14B schematically illustrate a reaction of an object of interest to varying surrounding conditions; and FIG. 15 explains the arrangement of a zero point at only a few positions in the sample in scanning a scan area.

DETAILED DESCRIPTION

In a method according to the present invention of spatial high resolution imaging a structure in a sample, the structure being marked with luminescence markers, light that has an effect on the emission of fluorescence light by the luminescence markers is directed onto the sample with an intensity distribution having a zero point and intensity maxima neighboring the zero point. Scan areas which is a partial areas of the sample are scanned with the zero point, and luminescence light emitted out of a local area including the zero point is registered and assigned to the respective location at which the zero point was located in the sample when the luminescence light was registered. A plurality of copies of an object of interest are arranged in the sample such that each of the copies of the plurality of copies overlaps with one of the scan areas, and the copies of the plurality of copies of the object of interest are subjected to varying surrounding conditions to measure reactions of the object of interest to these varying surrounding conditions. The individual scan areas are scanned with the zero point at least twice prior to, during and/or after the variation of the surrounding conditions. Dimensions of the scan areas are, in at least one direction and particularly in every direction in which the intensity maxima are neighboring the zero point, limited to not more than 75% of a distance of the intensity maxima in the respective direction.

In so far as luminescence markers are mentioned here, they may particularly be fluorescence markers. However, other luminescence markers may also be used whose luminescence properties may, for example, be based on chemiluminescence or electroluminescence. This includes that the excitation of the luminescence markers for the emission luminescence light is not limited to particular mechanisms in the method according to the present invention. Often, however, the excitation of the luminescence markers for the emission of luminescence light will be by excitation light.

The light that has an effect on the emission of luminescence light by the luminescence markers may be luminescence inhibiting light which inhibits the emission of luminescence light by the luminescence markers in that it, for example, transfers the luminescence markers into a dark state or de-excites excited luminescence markers by stimulated emission and thus inhibits them to emit luminescence light. Further, the light that has an effect on the emission of luminescence light by the luminescence markers may be light which transfers the luminescence markers out of a non-luminescent state into a further non-luminescent state in which they are particularly well protected against bleaching. Further, the light that has an effect on the emission of luminescence light by the luminescence markers may be light which only has such an effect on the emission of luminescence light by the luminescence markers that the emission of luminescence light only occurs out of the area of the zero point of the intensity distribution of the light if the light is combined with further light.

In another embodiment, the light that has an effect on the emission of luminescence light by the luminescence markers is luminescence enabling light which enables the emission of luminescence light by the luminescence markers in that it, for example, excites the luminescence markers for luminescence so that it is luminescence excitation light, or in that it transfers the luminescence markers out of a dark state into an excitable state.

The zero point of the intensity distribution of the light that has an effect on the emission of luminescence light by the luminescence markers is at least a local intensity minimum of the intensity distribution of the light. Often, it will be an intensity minimum in which the intensity of the light essentially drops to zero. In an ideal case, the intensity of the light in fact drops to zero in the center of the zero point. This, however, is no imperative requirement. If the light is luminescence inhibiting light, for example, it is sufficient that the intensity of the luminescence inhibiting light is so low in the area of the zero point that there is no or at least no essential, i.e. at least no predominant inhibition of the luminescence of the luminescence markers. The zero point is then delimited by the areas in which the luminescence inhibiting light at least essentially inhibits the emission of luminescence light by the luminescence markers. Everything between these areas in which the luminescence inhibiting light at least essentially inhibits the emission of luminescence light by the luminescence markers is called "zero point" or "area of the zero point", here.

If the intensity maxima neighboring the zero point of the intensity distribution of the light that has an effect on the emission of luminescence light by the luminescence markers are referenced in plural here, this shall not exclude cases in which the zero point is enclosed by an intensity maximum extending as a ring around the zero point. In each virtual section through the intensity distribution of the light that has an effect on the emission of luminescence light, such a ring-shaped intensity maximum appears in the form of two intensity maxima neighboring the zero point on both sides.

The intensity maxima may be neighboring the zero point in one, two or three directions. Thus, the zero point may be plane-shaped, line-shaped or point-shaped. The zero point may intersect a two- or one-dimensional sample in such a way that even a line-shaped or point-shaped zero point is delimited by the intensity maxima in all directions of main extension of the sample. Further, the scan areas may successively be scanned with a zero point which is not delimited by the intensity maxima in all directions of main extension of the sample with different orientations of the zero point to maximize the spatial resolution in imaging in all directions of main extension of the sample. The physical dimensions of the scan areas are limited in at least one direction, preferably in all directions in which the intensity maxima are neighboring the zero point in the sample.

The intensity maxima neighboring the zero point in the sample are often of a much higher light intensity than those areas of the intensity distribution of the light that has an effect on the emission of luminescence light by the luminescence marker which are directly delimiting the area of the zero point and in which the light already has the desired effect on the emission of luminescence light by the luminescence markers in that it, for example, inhibits this emission. The very high intensities in the intensity maxima are a consequence of the overall high intensity of the light which, on the other hand, is a precondition for that the area of the zero point in which the light has at least essentially no effect on the emission of luminescence light by the luminescence markers is strongly spatially delimited. As a consequence, there are intermediate areas between those areas of the light intensity distribution directly delimiting the area of the zero point and the intensity maxima of the intensity distribution in which the light intensity remains far below the light intensity within the intensity maxima. These intermediate areas are purposefully used in the method according to the invention in that the dimensions of the scan areas do not exceed 75% of the distance of the intensity maxima in the respective direction. If the dimension of the scanned area remains smaller than 50% of the distance of the intensity maxima in the respective direction, no point of the scan areas is subjected to the full intensity of the light intensity maxima. But even with a limit of 75% of the distance there is a significant limitation to the average intensity of the light that has an effect on the emission of luminescence light to which the scan areas are subjected to. It is to be understood that the average intensity of the light to which the scan areas are subjected to gets the smaller the more its dimensions remain smaller than the distance of the intensity maxima in the respective direction. From an absolute point of view, the dimensions of the scan areas in the respective direction between the intensity maxima may be 300 nm at maximum. Preferably, the dimensions in the respective direction are 200 nm at maximum, and more preferably they are about 100 nm. These absolute figures are related to wavelengths of the luminescence light, of the light that has an effect on the emission of luminescence light by the luminescence markers and/or of possible excitation light which are all in the visible range.

The scan areas may be partial areas of the sample which are the only partial areas of the sample scanned when executing the method according to the present invention and which, correspondingly, are to be directed to areas of the sample which overlap with the several copies of the object of interest in the sample.

In the method according to the invention, generally, all copies of the object of interest may be subjected to the same varying surrounding conditions. It is, however, preferred that different sets of the plurality of copies of the object of interest are subjected to different varying surrounding conditions in the sample. This particularly allows for measuring different reactions of the object of interest to the different varying surrounding conditions and to compare them with regard to each other. The reactions may be different both with regard to the result of the reaction and the reaction velocity. Here, it proves to be advantageous that the method according to the invention also allows for faster repetitions of scanning the scan areas with the zero point.

The surrounding conditions to which the copies of the object of interest are subjected in the method according to the invention may by different physical surrounding conditions, like for example different temperatures, different electric, magnetic or electromagnetic fields and the like. The surrounding conditions may also be varied by adding a chemical substance, i.e. include different chemical surrounding conditions. In a particular embodiment, a drug screening searching for substances which provoke a desired reaction in the object of interest may be executed by executing the present invention. For this purpose, many copies of the object of interest may individually or in larger sets be subjected to different substances which are examined for their suitability for causing the desired reaction. Due to the high spatial resolution of the method according to the invention, it is for example possible to measure spatial changes of the object of interest due to the influence of the respective substance which may not or only directly, and thus with a correspondingly higher effort, be measured with other methods.

To, for example, execute the mentioned drug screening particularly efficiently, the several copies of the object of interest may be arranged in a pattern defined with regard to fixed points of the sample in the method according to the present invention. Then, it is possible to approach the scan areas of the sample with the zero point with regard to the fixed points of the sample at a high efficiency. This may also be implemented fully automatically. Arranging the copies of the object of interest in the pattern may, for example, be executed by means of an immunoreaction or the like.

In the method according to the invention, the scan areas of the sample are, as a rule, repeatedly scanned with the zero point to measure the reactions of the object of interest to the varying surrounding conditions. At least during a repetition of scanning the scan areas of the sample, it is preferred to arrange the zero point at not more than 3 n or even not more than 2 n positions per scan area, n being the number of spatial dimensions in which the scan areas of the sample are scanned, to image the object of interest at a high precision. Such a low number of positions of the zero point is sufficient to determine the location of individual luminescence markers in the individual scan areas if the luminescence light registered for each scan area can always be assigned to a certain one of these luminescence markers. Such an assignment is possible, if at each point in time only one of the luminescence markers emits the luminescence light, so that a temporal differentiation is possible, or if the luminescence light can be assigned to individual luminescence markers due to its wavelength, for example. Thus, this embodiment of the method according to the invention may make use of the method known as MINFLUX. In MINFLUX, a zero point of a light intensity distribution of excitation light is positioned at four different positions in the sample, and the intensity of the luminescence light from an individual luminescence marker is registered for these four positions to determine the location of the individual luminescence marker in a sample plane.

The object of interest, of which several copies are arranged in the sample, may be a molecule, for example a protein molecule, a complex but also a more complex biological unit like a synapse, a membrane, any other cell component or a complete virus.

The frequency of consecutively scanning the scan areas with the zero point may be quite high so that even very fast changes or variations in the object of interest can be measured.

The invention purposefully accepts that the scanned areas and thus the imaged partial areas of the sample remain small. Often, the scan areas only extend over a distance of the order of magnitude of the diffraction barrier at the wavelength of the light that has an effect on the emission of the luminescence light by the luminescence markers. On the other hand, due to the essential reduction of the average light intensities to which the scan areas are subjected, it is possible to successfully use even luminescence markers with a strong tendency to bleach, or to scan the scan areas in the sample repeatedly with the zero point of the light intensity distribution.

The option of scanning the scan areas in the sample repeatedly at a high repetition rate with the zero point of the intensity distribution also enables to temporarily resolve dynamic processes in the structure of interest in the sample. As the luminescence markers in the sample, due to the method according to the invention, have a particularly low tendency to bleach so that a particular high number of photons is obtained from each individual fluorescence marker in the scan areas, particularly many images of the scan areas of the sample may be taken, and thus even long time variations of the object of interest in the sample may be observed. As a rule, each of the scan areas is scanned in not more than 100×100=10,000 image points. This is possible within a few milliseconds. Thus, image frequencies of 100 Hz and more can be realized.

In the method according to the invention, each of the scan areas of the sample may, however, be scanned with only very few positions of the zero point in the sample to, for example, determine the displacement of an individual fluorescence marker in the sample due to the variation of the surrounding conditions.

Advantageously, in each direction in which the intensity maxima are neighboring the zero point in the sample, the dimensions of the scan areas are not larger than 45%, 25% or even 10% of the distance of the intensity maxima in the respective direction. With regard to the intensity of the light that has an effect on the emission of luminescence light by the luminescence markers, it is advantageous if the dimensions of the scan areas, in each direction in which the intensity maxima are neighboring the zero point in the sample, are not larger than the distance over which the intensity of the light starting at the zero point increases in the respective direction up to 50%, 25%, 10% or 5% of the intensity of the light in the neighboring intensity maxima. Correspondingly, the maximum load of the luminescence markers in each of the scan areas is limited to 50%, 25%, 10% or 5% of the intensity of the light in the neighboring intensity maxima.

In all embodiments of the method according to the invention, it is often suitable, prior to scanning the scan areas, to image the structure marked with the luminescence markers in another way to determine the scan areas, i.e. the areas of the sample to be scanned. As a rule, the scan areas are a areas of interest of the sample in which particular details of the structure, i.e. of the copies of the object of interest, are present or in which particular reactions of the copies of the object of interest to the carrying surrounding conditions occur. This primary imaging may take place under local or large-area excitation of the luminescence markers for emission of fluorescence light and without using the light that has an effect on the emission of luminescence light.

Prior to scanning the scan areas, a larger area of the sample may be scanned with an at least by 50% reduced intensity of the light that has an effect on the emission of luminescence light and/or at an by at least 50% increased scanning speed to determine the position of the partial area to be scanned in the sample. In this primary scanning, all points of the larger area of the sample are subjected to the high intensity of the light in the area of the intensity maxima. This intensity, however, is purposefully reduced and/or only acts upon the luminescence markers over a shorter period of time.

In one embodiment, another scanner is used for scanning the larger area of the sample than for scanning the scan areas.

In using different scanners for scanning the larger area of the sample to determine the scan areas and for afterwards scanning the scan areas, scanners may be used which are particularly suited for scanning the strongly limited, i.e. small scan areas. Due to the small dimensions of the scan areas, these scanners may be scanners which do not allow for larger movements of the light intensity distribution with the zero point with regard to the sample, which, however, realize the possible movements very quickly and/or precisely. Thus, the scan areas can be scanned at a high repetition rate to, for example, monitor quick changes in the object of interest in the respective scan area.

Particularly, a sample stage or sample holder for the sample may be moved in at least one direction with regard to an objective by which the light is directed onto the sample, whereas for scanning the scan areas in at least one direction, an electro-optical scanner, an acousto-optical deflector or a galvo scanner or galvo mirror, i.e. a deflecting mirror with a galvanometric drive, is used. The scanner for the scan areas may also be combined with an additional electro-optical or acousto-optical modulator as a phase shifter for shifting the zero point of the light intensity distribution.

As already mentioned, the light that has an effect on the emission of luminescence light by the luminescence markers may particularly be luminescence inhibiting light which inhibits the emission of luminescence light by the luminescence markers outside the zero point. For example, the luminescence inhibiting light transfers or switches the luminescence markers in form of switchable proteins into a dark state in which they are not excitable for emission of luminescence light. The luminescence inhibiting light may particularly be directed onto the sample in combination with excitation light which excites the luminescence markers for emission of luminescence light and which has an intensity distribution with an intensity maximum in the area of the zero point of the luminescence inhibiting light. Except of the tight limits to the scan areas or of the scanning with increasing distance to the center points of the scan areas, this corresponds to the usual procedure in STED, RESOLFT or GSD fluorescence light microscopy.

In an embodiment of the method according to the invention, the concept known from WO 2014/108455 A1, i.e. carrying out STED fluorescence microscopy with switchable luminescence markers to protect the luminescence markers against the high intensities in the area of the intensity maxima of the stimulation light by switching them into an inactive state, is applied in a modified form. Particularly, additional switching off light is directed onto the sample with such an intensity distribution that it switches the switchable luminescence markers into an inactive state in neighboring areas of the sample neighboring the scan areas prior to scanning the scan areas with the zero point. This neighboring areas are neighboring the scan area in the at least one direction in which the intensity maxima are neighboring the zero point of the stimulation light in the sample. In this way, the luminescence markers are switched into the inactive state there, where the intensity maxima of the stimulation light are located and where, without this protection measure, the luminescence markers would be bleached by the high intensities of the stimulation light in scanning the scan areas. In that bleaching of the luminescence markers outside the scan areas is inhibited in this embodiment of the method according to the invention, it may successively be carried out for directly neighboring or even overlapping scan areas. In other words, the sample may be scanned with the scan areas, wherein the scan areas, in all or at least in selected positions in the sample, are scanned with the zero point.

The intensity distribution of the switch off light in the respective neighboring areas to be scanned afterwards may comprise a local intensity minimum in the scan areas formed by destructive interference, in which it does at least essentially not switch off the luminescence markers, i.e. in which it at least essentially leaves the luminescence markers in their active state in which they are excitable by the excitation light. Depending on the selection of the switchable luminescence markers, this active state may require or at least make it suitable that, prior to or temporarily overlapping with directing the light to the sample, switch on light is directed onto the respective one of the scan areas, which switches on the switchable luminescence markers into their active state.

When being switched on and/or off, switchable luminescence markers often emit luminescence light. This luminescence light may be registered and evaluated. The goal of this evaluation may, for example, be a decision whether a respective one of the scan areas delimited by a respective one of the respective neighboring areas is scanned with the zero point at all, or whether the respective one of the scan areas is only subjected to excitation light as a whole while luminescence light emitted then is registered confocally, or whether the respective one of the scan areas is not at all subjected to excitation light as the low intensity of the luminescence light registered while switching on and/or off indicates that there is no relevant concentration of luminescence markers. Further, the evaluation may have the goal to determine under which conditions directing the stimulation light onto the sample in each position of the zero point in the respective one of the scan areas delimited by the respective one of the neighboring partial areas and the registration of the luminescence light emitted out of the area of the zero point may suitably be stopped. For example, an upper and/or a lower threshold value for carrying out a RESCue method in the respective one of scan areas may be set depending on the result of the evaluation.

In an embodiment of the method according to the invention, luminescence light emitted out of the area of the zero point is registered with a point detector whose position with regard to the sample is not varied during scanning the respective one of the scan areas. This means that the movement of the zero point of the light intensity distribution of the light that has an effect on the emission of luminescence light by the luminescence markers is not considered in registering the luminescence light with the point detector. This is possible, because the dimensions of the scan areas are, as a rule, clearly smaller than the detection area of a point detector with regard to the sample. This even and particularly applies to a point detector confocally arranged with regard to the center point of the respective one of the scan areas. The luminescence light out of the entire respective one of the scan areas will reach such a point detector, because the dimensions of the respective scan area are, as a rule, smaller than the diffraction barrier at the wavelength of the luminescence light. The point sensor being spatially fixed means that the zero point, for scanning the respective one of the scan areas, is only moved by deflecting the light that has an effect on the emission of fluorescence light by the fluorescence markers. Even any excitation light needs not to be shifted together with the light that has an effect on the emission of luminescence light by the luminescence markers as its intensity maximum typically also covers the entire respective one of the scan areas.

As also already mentioned, the light that has an effect on the emission of luminescence light by the luminescence markers may alternatively be luminescence enabling light which enables the emission of luminescence light by the luminescence markers outside the zero point. This includes the option that this light is luminescence excitation light and the only light that is directed onto the sample. This also includes the option that the light is luminescence activation light which transfers the luminescence markers out of a dark state into a state excitable for luminescence, i.e. activates the luminescence markers. The light that has an effect on the emission of luminescence light by the luminescence markers may also have both functions, i.e. activating and exciting, and may have two components of different wavelengths for this purpose. When the scan areas are scanned with the zero point of the intensity distribution of the light that has an effect on the emission of luminescence light by the luminescence markers, the scan areas are kept small to subject the luminescence markers located in the scan areas not at all, or at least as little as possible, to the high light intensities in the area of the intensity maxima neighboring the zero point. Registering the luminescence light emitted by the luminescence markers in the sample in this embodiment of the method may be carried out with a camera, and the evaluation typically includes deconvolving the registered intensity distributions with regard to the actual position of the zero point in the sample and the associated variations of the intensity distribution of the luminescence light emitted out of the sample and registered with the camera.

If, in each of the scan areas, only one luminescence marker emits the registered luminescence light emitted out of the sample, its position in the sample may also very simply be determined from the luminescence light registered for the different positions of the zero point in the respective scan area, like for example by fitting a function comprising a local extremum, wherein the position of the extremum of the fitted function may be taken as the searched for position of the luminescence marker. This procedure is both possible, if the light which has an effect on the emission of luminescence light by the luminescence markers and whose intensity distribution has the zero point is luminescence inhibiting light and if it is luminescence enabling or excitation light. In the first case, the intensity maxima of the luminescence inhibiting light inhibit in an advantageous way that luminescence light emitted by other luminescence markers in the neighborhood disturbs the position determination. In the second case, the respective luminescence marker in the respective scan area is only subjected to a minimum light amount and thus minimally photochemically loaded.

The drawback of the method according to the present invention that each scanned and thus imaged partial area of the sample remains very small may at least partially be compensated for in that the sample is simultaneously scanned in several partial areas. Here, particularly, a grid of zero points of the light that has an effect on the emission of luminescence light by the luminescence markers may be used. Even then, the grid of zero points is not shifted so that the entire sample is imaged, i.e. over the full distances of the zero points in the grid. Instead, the individual partial areas in which the sample is scanned remain separated from each other even in this embodiment of the method according to the present invention. Only then the reduction of the danger of bleaching the luminescence markers in the scanned partial area is achieved without further measures like switching off the luminescence markers in actually not scanned parts of in the sample to protect them against the bleaching effect of the high light intensities. It will be clear to those skilled in the art that, in case of switchable luminescence markers being used in this embodiment of the invention, the switchable luminescence markers will only be in their fluorescent state in the respective scan areas, and that the sample may additionally be scanned with the scan areas and thus be imaged completely.

As several copies of an object of interest are arranged each overlapping with one or several scan areas, a partial image of this object is obtained by scanning each scan area. If these partial images are statistically distributed over the object and if their number is sufficiently high, a full image of the entire object of interest may be reconstructed from the partial images. It is clear that this reconstruction requires that the several copies of the object of interest are at least essentially identical. For assigning the partial images to particular points of the object of interest, the copies of the object of interest in the sample may additionally be imaged in another way to determine their position and orientation with regard to the scan areas.

A scanning luminescence light microscope for carrying out the method according to the invention comprises a light source for the light that has an effect on the emission of luminescence light by the luminescence markers, a light shaper which directs the light onto the sample with an intensity distribution having a zero point and intensity maxima neighboring the zero point, a scanner to scan the partial area of the sample to be scanned with the zero point, a detector registering the luminescence light emitted out of the area of the zero point, and a controller for carrying out the method according to the invention.

The detector may be a point detector, wherein the position of the point detector may be fixed with regard to the sample during scanning a respective one of the scan areas. This means that the detector may detect the luminescence light emitted out of the sample without descanning the luminescence light, because the scan areas, as a rule, will have dimensions well below the diffraction barrier. Then, a further scanner may be provided which differs from the scanner for scanning the scan areas with the zero point and which is configured to scan, in at least one direction, a larger area of the sample.

The scanner for scanning the larger partial area of the sample in at least one direction may include a sample holder or stage which is movable with regard to an objective lens of the light shaper, whereas the scanner for scanning the partial area of the sample to be scanned in at least one direction may include an electro-optical scanner, an acousto-optical deflector, a galvo scanner or a galvo mirror.

In other embodiments of the scanning luminescence light microscope for carrying out the method according to the invention, the detector may, for example, be a point detector which registers the descanned luminescence light emitted out of the sample, or a two-dimensional detector, like a camera, which registers the not descanned luminescence light in a fixed relative position with regard to the sample.

In a scanning luminescence light microscope for carrying out an STED method according to the present invention, the light provided by the light source is stimulation light, and there is a further light source providing excitation light, wherein the light shaper directs the excitation light onto the sample with an intensity distribution which has a maximum in the area of the zero point of the luminescence inhibiting light.

For carrying out the method according to the invention which makes use of switchable luminescence markers, an additional switch off light source for switch off light is to be provided in the scanning luminescence light microscope, wherein the light shaper directs the switch off light onto the sample with such an intensity distribution that it switches off the switchable luminescence markers into an inactive state in a neighboring areas of the sample neighboring the scan areas. The neighboring areas are neighboring the scan areas in the at least one direction in which the intensity maxima are neighboring the zero point of the stimulation light in the sample. Additionally, a switch on light source for switch on light may be provided, which switches the switchable luminescence markers into their active state, wherein the light shaper, prior to or temporarily overlapping with the switch off light, directs the switch on light onto the sample in partial areas including the scan areas.

In testing the method according to the invention, an increase in the yield of photons from the luminescence markers in the sample by a factor>100 has been achieved. This means that one hundred times more images may be taken from a changing structure of interest in the sample to record its changes. Additionally, the time needed for each individual image is smaller, as continuously more photons per time unit are emitted by the luminescence markers in the sample.

Figure 1:
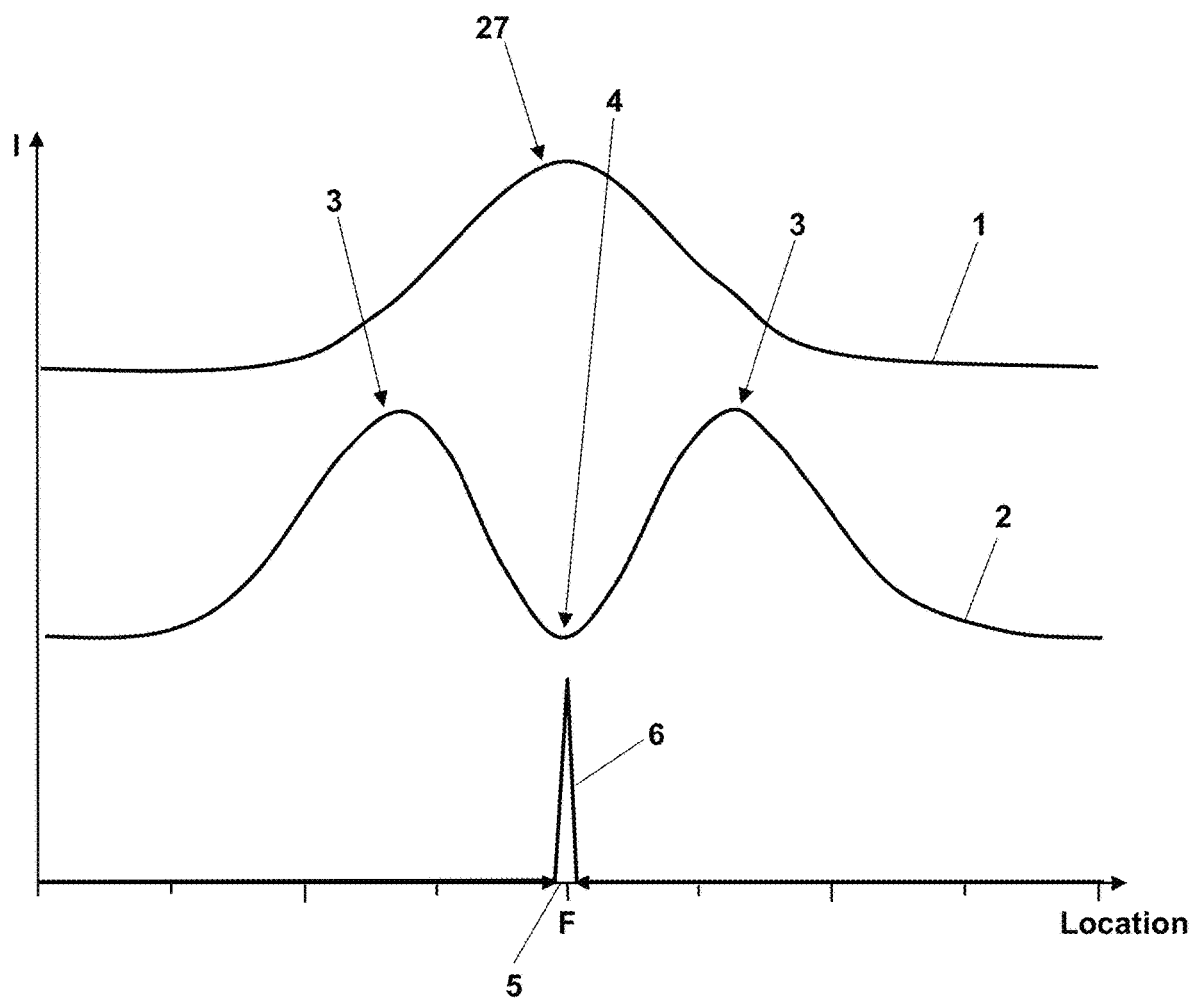

Now referring now in greater detail to the drawings, FIG. 1, at its top, depicts a section through an intensity distribution of excitation light 1. The excitation light 1 has an intensity maximum 27 of a maximum intensity I at a geometric focal point F. However, the intensity I is distributed over an area with dimensions extending far beyond the focal point F in all directions. The diameter of this area corresponds to the diffraction barrier at the wavelength lambda of the excitation light 1 and the numerical aperture NA of an objective lens used for focusing the excitation light 1 into the focal point F according to lambda/NA. To limit the effective excitation of the luminescence markers in the sample to a smaller area than the area over which the intensity distribution of the excitation light 1 extends, fluorescence inhibiting light 2 is additionally directed onto the sample which has a zero point 4 and intensity maxima 3 neighboring the zero point 4. The luminescence inhibiting light 2 inhibits the emission of luminescence light by the fluorescence markers excited by the excitation light 1 in that the fluorescence markers are, for example, de-excited again by means of stimulated emission. Everywhere outside the area 5 of the zero point 4 of the fluorescence inhibiting light 2, the intensity I of the fluorescence inhibiting light 2 is so high that this de-excitation is complete, i.e. that the luminescence markers located there do not emit any fluorescence light. Vice versa, the term "zero point 4" refers to the entire area 5 within which the intensity I of the fluorescence inhibiting light 2 remains so small that it does at least not completely inhibit the emission of fluorescence light by the fluorescence markers located here. At the bottom, FIG. 1 shows the spatial distribution of the effective fluorescence excitation 6. This effective fluorescence excitation 6 is limited to the area 5 of the zero point 4. If a sample is scanned with the zero point 4, fluorescence light emitted out of the sample always comes out of the area 5 and may thus be assigned to the location of the area 5 within the sample.

When the zero point 4, during scanning a sample, gets closer to a structure of interest marked with fluorescence dye, i.e. with the fluorescence markers, the fluorescence markers first get into the area of the intensity maxima 3 and the superimposed intensities of the excitation light 1 before they get into the area 5 of the zero point 4. Particularly during scanning the sample line by line, the fluorescence markers are repeatedly subjected to high light intensities before they get into the area 5 and fluorescence light emitted by them is registered for the first time. This may result in that the fluorescence markers are already bleached before they first get into the area 5. Due to this effect, repeatedly scanning the same sample to, for example, monitor temporal changes of the structure of interest marked with the fluorescence markers in the sample is often impossible.

Figure 2:
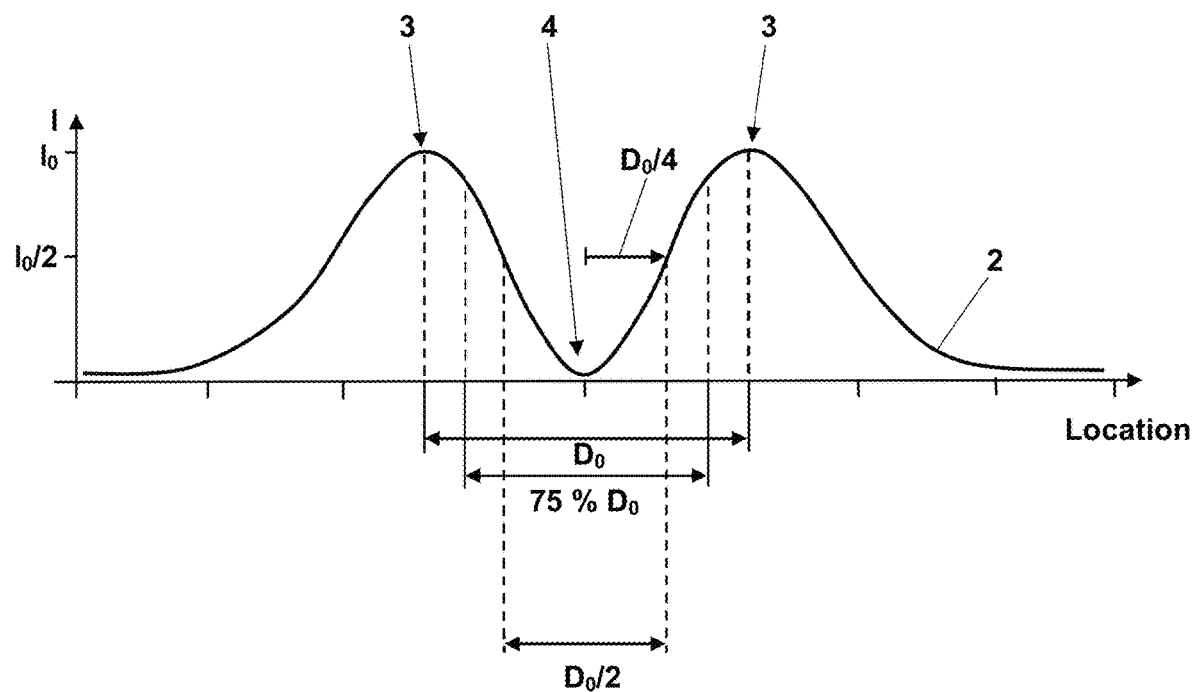
FIG. 2 shows, for the intensity distribution of the fluorescence inhibiting light according to FIG. 1, dimensions of a scan area of a sample to be scanned with the intensity distributions according to FIG. 1 in a method according to the invention.

If, however, the scan area of the sample scanned with the zero point 4 is delimited to not more than ¾ or 75% of a distance $D_0$ of the intensity maxima 3 as it is depicted in FIG. 2, the average stress of the fluorescence markers in the scan area caused by the high intensities of the fluorescence inhibiting light 2 in the area of the intensity maxima, particularly in combination with the intensity of the excitation light 1 according to FIG. 1, is already reduced. This stress is further reduced, if the dimensions of the scan area are limited to not more than half the distance $D_0$ of the intensity maxima 3. With limiting the dimensions to less than $D_0/2$, no point of the scan area gets into the peak regions of the intensity maxima 3 when scanning the scan area. If the dimensions of the scan area are limited to $D_0/4$, the maximum intensity of the fluorescence inhibiting light 2 to which the sample is subjected to within the scan area is reduced to about $I_0/2$, wherein $I_0$ is the maximum intensity of the fluorescence inhibiting light 2 in the intensity maxima 3.

Figure 3:
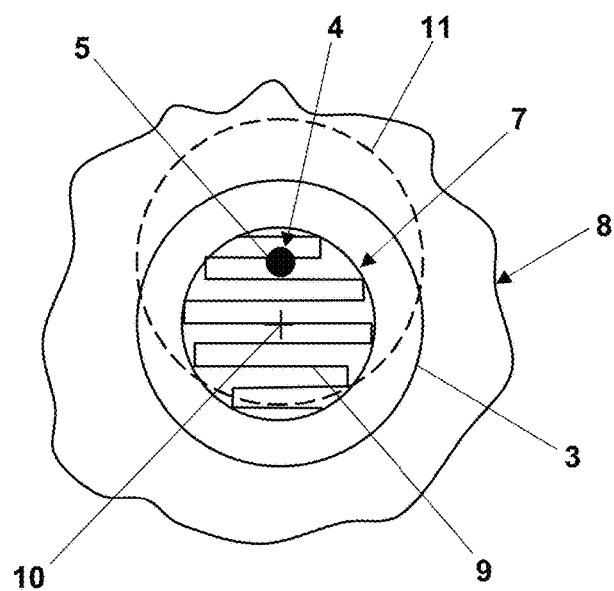
FIG. 3 is a schematic drawing of a scan area of a sample to be scanned in a top view, wherein scanning takes place along a meander-shaped course.

FIG. 3 illustrates scanning a scan area 7 of a sample 3 which is only in part depicted here with the area 5 of the zero point 4 along a course 8 which is meander-shaped here. The partial area 7 to be scanned is depicted within the intensity maxima 3, wherein the positions of these intensity maxima 3 correspond to an alignment of the zero point 4 to a center point 10 of the scan area 7. Correspondingly, the intensity maxima or more precisely the here ring-shaped intensity maximum 3 extending around the position of the zero point 4 highlighted in FIG. 3 and indicated with a dashed line 11 still overlaps with the scan area 7. This overlap, however, may be avoided by further limiting the dimensions of the scan area 7 to less than $D_0/2$. However, even by means of the limitation of the dimensions of the partial area 7 to about $2D_0/3$ as depicted here, a considerable reduction of the average load of the fluorescence markers in the scan area 7 by the fluorescence inhibiting light 2 is achieved.

Figure 4:
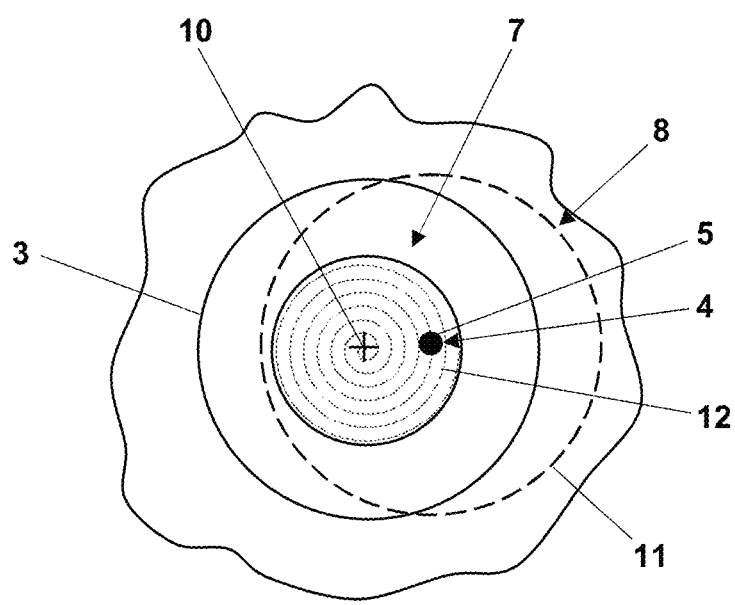
FIG. 4 is a schematic drawing of a scan area of a sample to be scanned in a top view, wherein scanning takes place along a spiral-shaped course.

FIG. 4 illustrates a scan area 7 of the sample 8, which is reduced to $D_0/2$. Here, the course of the ring-shaped intensity maximum 3 indicated with the dashed line 11 does no longer reach the partial area 7 in any position of the zero point 4 within the scan area 7. Further, FIG. 4 shows a spiral course 12 along which the scan area 7 is scanned starting from the center point 10. Independent on the shape of the course along which the zero point 4 is moved when scanning the scan area 7, the fluorescence light emitted out of the sample 8 and registered is assigned to the respective location of the zero point 4 within the sample 3.

FIG. 5 illustrates a scanning fluorescence light microscope 13 which is particularly suited for carrying out a method according to the present invention. The scanning fluorescence light microscope 13 comprises a light source 14 providing the fluorescence inhibiting light 2 whose cross section is widened by means of a widening optic 15 and whose wave fronts across its cross section are modulated by means of a phase plate 16 in such a way that the zero point 4 and the neighboring intensity maxima 3 according to FIGS. 1 and 2 are formed around the respective focus point F when the fluorescence inhibiting light 2 is focused into the sample 8 by means of an objective lens 45. A further light source 17 with a further widening optic 18 is providing the excitation light 1. By means of a dichroitic mirror 19, the excitation light 1 and the fluorescence inhibiting light 2 are combined such that the excitation light 1 has its intensity maximum 27 according to FIG. 1 in the area 5 of the zero point 4 of the fluorescence inhibiting light 2. The fluorescence light 20 emitted out of the area of the zero point of the fluorescence inhibiting light 2 is separated by means of a dichroitic mirror 26, registered with a point detector 21 and assigned to the respective location of the zero point 4 within the sample 8. Scanners 22 and 23 are provided for two orthogonal scanning directions, and they are operated in combination for scanning the respective scan area in the sample 8 with the zero point of the fluorescence inhibiting light 2. The scanners 22 and 23 only have an influence on the direction of the excitation light 1 and the fluorescence inhibiting light 2; they may even only be arranged in the beam path of the fluorescence inhibiting light 2. As the scan area 7 of the sample 8 has dimensions below the diffraction barrier, the fluorescence light 20 emitted out of the area of the zero point of the fluorescence inhibiting light 2 within the scan area in the sample 8 always gets into the point detector 21 even with a spatially fixed arrangement of the point detector 21 with regard to the sample 3, i.e. despite the shifting of the zero point by means of the scanners 22 and 23. This is because the scan area 7 has dimensions below the diffraction barrier. For scanning the sample 8 beyond the scan area 7 to, for example, at first determine the position of a suitable scan area, further scanners are provided in the area of the sample holder 24 which are here only indicated by corresponding shifting symbols 25.

Up to here, it has not yet been explicitly stated that the zero point 4 of the intensity distribution of the fluorescence inhibiting light 2 may also be delimited by neighboring intensity maxima 3 in a z-direction in which the fluorescence inhibiting light 2 is directed onto the sample to increase the spatial resolution in imaging the structure of interest in the sample 8 also in this z-direction. Correspondingly, the scan area 7 is then also to be limited in this z-direction to not more than 75%, preferably less than 50% of the distance of the intensity maxima of the light in the z-direction or also to be scanned in the z-direction starting at its center point 10 and with increasing distance to the center point 10. An increased spatial resolution in imaging the sample in z-direction may also be achieved by other measures like, for example, a 4PI arrangement or a 2 photon excitation of the fluorescence markers for emitting the fluorescence light or other measures known in the field of fluorescence microscopy. It also generally applies that the methods described here may be supplemented with other measures known in the field of fluorescence microscopy. Applying the fluorescence inhibiting light 2 and/or the excitation light 1 in pulses, a simultaneous continuous application of the excitation light 1 or the fluorescence inhibiting light 2, a gated registration of the fluorescence light in a defined temporal gate after the respective pulses and so on belong to these measures.

Figure 6:
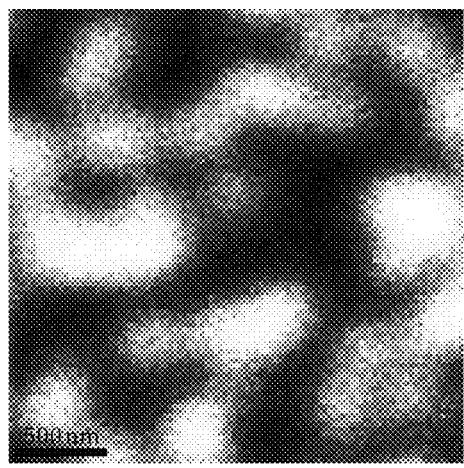
Figure 6:
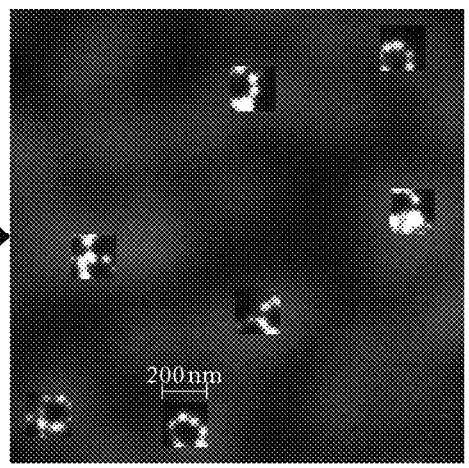

The confocal image according to FIG. 6 A has been taken of a sample in which a structure of interest has been marked with the luminescence marker Nukleoporine gp210. The confocal image provides an overview over the structure of interest. From this overview, separate scan areas have been selected in which STED images have been taken according to the method of the present invention. These scan areas are smaller than the focal area of the excitation light. In the scan areas, the structure of interest is imaged both at a high spatial resolution and at a high yield of fluorescence light. For imaging the partial image of the sample depicted in FIG. 6 B and presenting the scan areas, excitation light at a wavelength of 635 nm and at a power of 5 µW has been directed to the sample in pulses at a repetition rate of 20 MHz. STED light at a wavelength of 775 nm has been directed to the sample in synchronized pulses at a pulse length of 1.2 ns at a power of 150 mW. The excitation light and the STED light have been focused into the sample by means of an 1.4 NA oil inversion objective lens. The fluorescence light has been focused by means of the oil inversion objective lens and a further lens onto a point detector.

FIG. 7 illustrates the bleaching behavior of dyed nuclear pore protein complexes depending on the dimensions of the scan area in STED scanning fluorescence light microscopy. $\tau\frac{1}{2}$ indicates the number of images which may be taken before the fluorescence signal drops to half of the starting value due to bleaching. $\tau\frac{1}{2}$ is plotted over the dimensions of the scan area in nanometer. The STED power was 160 mW, the excitation power 2 µW. Otherwise, the STED conditions corresponded to those according to FIG. 6. With dimensions of the scan area of 100×100 nm², bleaching is reduced by a factor of 100 as compared to dimensions of 800×800 nm². Correspondingly, 100 times more images may be taken of the same scan area to, for example, monitor a dynamic process in the sample.

The scanning fluorescence microscope 13 according to FIG. 8 comprises the following differences with regard to the scanning fluorescence microscope depicted in FIG. 5. As viewed from the sample 8, the point detector 21 is arranged behind the scanners 22 and 23 so that the scanners descan the fluorescence light 20 coming from the sample 3 towards the detector 21. Here, the scanners 22 and 23 are provided both for scanning the scan area to be scanned with the zero point of the fluorescence inhibiting light 2 and for generally arranging and shifting the scan area in the sample 8. FIG. 8 also shows a detector 28 for fluorescence light arranged upstream to the scanners 22 and 23 as viewed from the sample 8. This, however, is no point detector but a camera 29, i.e. a two-dimensional detector. This detector 28 may be provided in addition to the point detector 21 or instead of the point detector 21, wherein a dichroitic mirror 30 deflecting the fluorescence light 20 towards the detector 28 is either temporarily or permanently arranged between the objective lens 45 and the scanners 22 and 23.

Further, there is a switch off light source 31 to which a widening optic 32 is assigned in the scanning fluorescence microscope 13 according to FIG. 8 to provide switch off light 34 prior to scanning the respective scan area with the zero point of the fluorescence inhibiting light 2. The switch off light 34 is coupled in by means of a dichroitic mirror 43, and its intensity distribution in the sample 8 is formed by beam shaper 33 such that it switches switchable luminescence markers located in the sample 8 in a partial area of the sample 8 neighboring the partial area to be scanned into an inactive state. In this inactive state, the switchable luminescence markers in the sample 8 are not excitable for the emission of fluorescence light 20 by means of the excitation light 1. Correspondingly, there is no relevant danger of bleaching due to the fluorescence inhibiting light 2 in form of stimulation light for the luminescence markers in the area neighboring the scan area. Thus, with the scanning fluorescence microscope 13 according to FIG. 8, it is possible to scan a further scan area of the sample 8 which is neighboring an already scanned scan area of the sample 8 with the zero point of the fluorescence inhibiting light 2 and to register fluorescence light 20 emitted out of the sample 3 because the luminescence markers located in the further scan area have not been bleached by previously scanning the neighboring scan area as they have been in their inactive state protecting them against bleaching.

To be able to excite the luminescence markers in the neighboring scan area with the excitation light 1 for emission of fluorescence light 20, they have to be in their active state. To achieve this, one may wait for a spontaneous return of the luminescence markers out of their inactive state into their active state. The scanning fluorescence microscope 13 according to FIG. 8, however, also comprises an additional switch on light source 35 with a widening optic 36 providing switch on light 37 and directing it onto the sample 8 via a dichroitic mirror 44. By means of the switch on light the luminescence markers in the next scan area are at first switched into their active state. The partial area of the sample 8 covered by the switch on light 37 may be larger than the scan area to be scanned next, as afterwards, by means of the switch off light 34, the luminescence markers outside the scan area to be scanned next are transferred into their inactive state. Thus, the sample 8 may be scanned with the scanning fluorescence microscope 13 in two steps, i.e. in big steps with the scan area and in small steps with the zero point of the fluorescence inhibiting light 2 within each location of the scan area.

In switching on and/or switching off the luminescence markers in the sample 8 with the switch on light 37 or the switch off light 34, various switchable luminescence markers are also excited for the emission of fluorescence light 20. This fluorescence light 20 thus already provides information about the concentration of the luminescence markers in the respective partial area of the sample 8. This information may correspondingly be evaluated and used for a decision on whether there is any value in scanning the next scan area with the zero point of the fluorescence inhibiting light 2 or not. If there is no value, such a scanning will also not be executed to not unnecessarily subject the sample 8 to the fluorescence inhibiting light 2. Additionally, the fluorescence light registered during switching on and switching off the luminescence markers may be used to set an upper and/or lower threshold for the fluorescence light registered at the respective location of the zero point of the fluorescence inhibiting light 2 in the scan area to limit the subjection of the sample 8 to the fluorescence inhibiting light 2 and the excitation light 1 as early as suitable according to a RESCue method.

Last but not least, FIG. 8 depicts a controller 38 for the light sources 14 and 17, the switch on light source 35, the switch off light source 31 and the scanners 22 and 23 of the scanning fluorescence microscope 13 to control them for carrying out the method according to the invention.

FIG. 9 depicts a scan area 7 and the intensity maximum 3 of the fluorescence inhibiting light encircling this partial area 7, the zero point of the fluorescence inhibiting light being in the center point 10 of the scan area 7. Additionally, a ring-shaped neighboring partial area 39 is depicted in FIG. 9, within which the sample 8, prior to scanning the scan area 7 is subjected to the switch off light 34 to transfer the switchable fluorescence markers located here into their inactive state. The partial area 39 leaves out the scan area 7, i.e. the intensity of the switch off light 34 is zero or at least so small in the scan area 7 that it is not sufficient for switching off the luminescence markers within the period of time for which the switch off light 34 is directed to the sample 8. To ensure that the switchable luminescence markers, at least in the scan area 7, are in their active state, the switch on light 37 is directed onto the sample 8 in a circular-shaped partial area 40 which includes the scan area 7 prior to or temporarily overlapping with the switch off light 34.

FIG. 10 illustrates how the sample 8 may be scanned with the scan area 7. Here, FIG. 10 A shows several consecutive positions of the circular scan area 7 according to FIG. 9 in the sample 8; and for one of these positions of the scan area 7 the course 9 along which a square area of the sample 8 is scanned is depicted within the partial area 7. FIG. 10 B shows how the sample 8 may be completely covered with such square partial areas 41 and thus be imaged completely.

FIG. 11 A illustrates another way of scanning the sample 8 with the scan area 7. Here, the consecutive positions of the circular scan area 7 are arranged in a hexagonal arrangement within the sample 8. The course 9 along which the partial area 7 is scanned with the zero point of the luminescence inhibiting light in each of its positions extends over a regular hexagon. FIG. 11 B shows how the entire sample 8 may be covered and thus imaged with these regular hexagons 42.

The embodiment of the method according to the invention depicted in FIG. 12 in a block diagram starts with marking 46 a plurality of copies of an object of interest with luminescence markers. Here, each of the copies of the object of interest is marked with several luminescence markers. The number of luminescence markers per copy of the object may, however, be small and only be two, for example. Particularly, two different areas of the object of interest, like for example of a protein, may be marked with two equal or two different fluorescence markers to image the structure of the object in so far how far these two areas of the object of interest are away from each other at present. In afterwards arranging 47 the plurality of the copies of the objects of interest in the scan areas 7 of the sample 8, one copy of the object of interest is arranged in each of the scan areas 7. This arranging 47 of exactly one copy of the object of interest in each scan area may be implemented on the basis of an immunoreaction via which one copy of the object of interest is coupled to the center of each scan area 7. The succeeding determination 48 of the locations of the luminescence markers in the sample 8 is implemented by scanning the scan areas 7 with the zero point of the intensity distribution of the light which has an effect on the emission of fluorescence light by the fluorescence markers, i.e. luminescence excitation light, for example. Particularly, the locations of the luminescence markers in the sample 8 may be determined from the intensities of the luminescence light which are registered for the individual positions of the zero point in the sample 8 with regard to each of the scan areas 7. If afterwards a variation 49 of the surrounding conditions of the object of interest occurs which has an effect on the structure of the object of interest and thus on the relative locations of the luminescence markers in the sample 8, this effect may be measured by repeating the step of determining 48. The step of determining 48 may be repeated for a plurality of times, wherein these repetitions may also begin during the step of varying 49 and also be continued afterwards to measure the dynamics of the reaction of the object of interest to the varying surrounding conditions.

FIG. 13 shows a sample 8 in which a plurality of scan areas 7 are arranged in a defined way in a pattern 51 with regard to fixed points 50. The pattern 51 is a square pattern here, in which the scan areas 7 are uniformly arranged in rows 52 and columns 53. Here, each of the scan areas 7 can be found and approached by the zero point of the intensity distribution of the light that has an effect on the emission of fluorescence light by the fluorescence marker using the fixed points 50. In the centers 54 of the scan areas 7, the copies of the object of interest may be coupled by means of the immunoreaction mentioned above so that one copy of the object of interest is arranged overlapping with each of the scan areas 7.

FIG. 14 strongly schematically shows an object of interest 55 which is marked with two luminescence markers 56 and 57 in two areas, the two luminescence markers 56 and 57 being depicted in different ways, here. It is shown that the luminescence markers 56 and 57 are arranged at the two ends of the line-shaped object 55. FIG. 14 A shows a straightened structure of the object 55, whereas FIG. 14 B shows a curved or folded structure of the object 55. The change between the straightened structure according to FIG. 14 A and the folded structure according to FIG. 14 B may be the reaction of the object 55 to varied surrounding conditions, for example a variation of the pH-value or the presence of a certain chemical substance. The change of the structure may easily be registered by means of the method according to the invention in that the distance between the two luminescence markers 56 and 57 is measured. For this purpose, the positions of the two luminescence markers 56 and 57 in the sample may be simultaneously determined, if the luminescence light emitted by them may be separated by different wavelengths or temporally, if both of the two luminescence markers 56 and 57 only emit luminescence light temporarily. Fluorescence light temporarily emitted by only one of the two luminescence markers 56 and 57 each, even if the two luminescence markers 56 and 57 are identical, may be achieved by various means. For example, it may be achieved in that the luminescence markers 56 and 57, due to their excitation with luminescence excitation light, temporarily get into a dark state, or in that they are made as switchable luminescence markers which may be switched into a dark state with additional switch off light.

FIG. 15, for one scan area 7, shows four positions 58 and 59 at which the zero point of the intensity distribution of the light that has an effect on the emission of fluorescence light may be arranged to determine the location of an individual emitting luminescence marker 56, 57 in the scan area 7. Here, the position 58 is at the center 54 of the scan area 7, and the positions 59 are on a circle along the border of the scan area 7. In that the scan area 7 is only scanned with four positions of the zero point to determine the location of the respective luminescence marker 56, 57 in a plane of the sample, this determination may be executed very quickly. If, further, the light that has an influence on the emission of fluorescence light and which is directed onto the sample with the intensity distribution comprising the zero point is excitation light so that it only hits the respective luminescence marker 56, 57 with a low intensity, only very few photons from the respective luminescence marker 56, 57 are needed for determining its position in the scan area 7. Even with sensitive luminescence markers this allows for a repeated localization to measure reactions of the object of interest 55 to varying surrounding conditions.

Many variations and modifications may be made to the preferred embodiments of the invention without departing substantially from the spirit and principles of the invention. All such modifications and variations are intended to be included herein within the scope of the present invention, as defined by the following claims.

We claim:
1. A method of high resolution imaging a structure in a sample, the structure being marked with luminescence markers, the method comprising
  directing light that has an effect on the emission of luminescence light by the luminescence markers onto the sample with an intensity distribution which has a zero point and intensity maxima neighboring the zero point in at least one direction and having a distance in the at least one direction;
  scanning scan areas with the zero point, the scan areas being parts of the sample;
  while scanning the scan areas, registering luminescence light emitted out of a local area including the zero point in the sample;
  assigning the registered luminescence light to a respective location of the zero point in the sample; and
  limiting dimensions of the scan areas, in the at least one direction in which the intensity maxima are neighboring the zero point in the sample, to not more than 75% of the distance of the intensity maxima in the at least one direction,
  wherein each of a plurality of copies of an object of interest is arranged such that it overlaps with one of the scan areas of the limited dimensions, and
  wherein the plurality of copies of the object of interest are subjected to varying surrounding conditions to measure reactions of the object of interest to the varying surrounding conditions, wherein the individual scan areas are scanned with the respective zero point at least two times at two different stages of the reactions to the varying surrounding conditions.

2. The method of claim 1, wherein the two times at which the scan areas are scanned with the respective zero point are selected from
a time prior to varying the surrounding conditions,
a first time during varying the surrounding conditions,
a second time during varying the surrounding conditions arranged at an interval of time to the first time, and
a time after varying the surrounding conditions.

3. The method of claim 1, wherein different sets of the plurality of copies of the object of interest in the sample are subjected to different varying surrounding conditions.

4. The method of claim 1, wherein the surrounding conditions are varied by adding a chemical substance.

5. The method of claim 1, wherein the plurality of copies of the object of interest are arranged in a pattern defined with regard to fixed points of the sample, and wherein the scan areas are approached with the zero point in relation to the fixed points of the sample.

6. The method of claim 1, wherein at at least one time at which the individual scan areas are scanned with the respective zero point, the zero point is arranged in not more than 3 n or 2 n positions per scan area, wherein n is the number of the spatial dimensions in which the scan areas are scanned.

7. The method of claim 1, wherein the object of interest arranged in a plurality of copies in the sample is selected from a group including molecules, proteins, complexes, synapses, membranes, cell components and viruses.

8. The method of claim 1, wherein the dimensions of the scan areas in the at least one direction in which the intensity maxima are neighboring the zero point in the sample are not larger than 25% of the distance of the intensity maxima in the at least one direction.

9. The method of claim 1, wherein the dimensions of the scan areas in the at least one direction in which the intensity maxima are neighboring the zero point in the sample are not larger than a distance over which an intensity of the light in the at least one direction, starting at the zero point, increases up to 25% of the intensity of the light in the neighboring intensity maxima.

10. The method of claim 1, wherein, prior to scanning the scan areas, the structure in the sample is images in another way to determine a position of the scan areas in the sample.

11. The method of claim 10, wherein, prior to scanning the scan areas, a larger area of the sample larger than the scan areas is scanned with the zero point at at least one of
an at least 50% lower intensity of the light and
an at least 50% higher scanning speed.

12. The method of claim 10, wherein a scanner is used for scanning the scan areas, and wherein another scanner is used for scanning the larger area of the sample.

13. The method of claim 12, wherein a sample holder is moved relative to an objective lens by which the light is directed onto the sample for scanning the larger area of the sample, and wherein at least one of
an electro-optical scanner,
an acousto-optical deflector,
a galvo scanner and
a galvo mirror
is used for scanning the scan areas in the at least one direction.

14. The method of claim 1, wherein the light that has an effect on the emission of luminescence light by the luminescence markers is luminescence enabling light.

15. The method of claim 14, wherein the luminescence enabling light enables the emission of luminescence light by the luminescence markers in that it excites the luminescence markers for luminescence or transferred out of a dark state into an excitable state.

16. The method of claim 1, wherein the light that has an effect on the emission of luminescence light by the luminescence markers is luminescence inhibiting light whose wavelength is selected such as to inhibit the emission of luminescence light by the luminescence markers outside the zero point.

17. The method of claim 16, wherein the luminescence inhibiting light is stimulation light whose wavelength is selected such as to inhibit the emission of luminescence light by the luminescence markers outside the zero point by stimulated emission, wherein the stimulation light is directed onto the sample together with excitation light whose wavelength is selected such as to excite the luminescence markers for emission of luminescence light and which has an intensity distribution comprising a maximum overlapping with the zero point of the luminescence inhibiting light.

18. The method of claim 14, wherein, prior to scanning the scan areas with the zero point, additional switch off light is directed onto the sample with such an intensity distribution that the switch off light, in neighboring areas, switches the luminescence markers into an inactive state, wherein the neighboring areas are neighboring the scan areas in the at least one direction in which the intensity maxima are neighboring the zero point in the sample.

19. The method of claim 18, wherein the sample is scanned with the scan areas, wherein the scan areas in all positions or in selected positions of the scan areas in the sample are scanned with the zero point.

20. The method of claim 18, wherein the intensity distribution of the switch off light comprises a local intensity minimum formed by destructive interference in the scan area.

21. The method of claim 18, wherein, prior to or temporarily overlapping with directing the switch off light to the sample, switch on light is directed onto the scan areas that switches the luminescence markers into their active state.

22. The method of claim 18, wherein luminescence light emitted by the switchable luminescence markers upon being switched on or off is registered and evaluated.

23. The method of claim 22, wherein a result of the step of evaluating is at least one of the following:
whether a respective one of the scan areas delimited by a respective one of the neighboring areas will be scanned with the zero point;
whether the excitation light will be directed onto the sample in the scan areas delimited by a respective one of the neighboring areas; and
under which conditions directing the stimulation light onto the sample in each position of the zero point in a respective one of the scan areas delimited by a respective one of the neighboring areas, and registering the luminescence light emitted out of the local area including the zero point in the sample will be interrupted.

24. The method of claim 1, wherein the luminescence light emitted out of the local area including the zero point in the sample is registered with a point sensor whose position with regard to the sample remains unchanged during scanning a respective one of the scan areas.

25. The method of claim 1, wherein the several scan areas of the sample are scanned simultaneously.

* * * * *